United States Patent
Washizawa et al.

(10) Patent No.: US 7,084,949 B2
(45) Date of Patent: Aug. 1, 2006

(54) APPARATUS FOR ARRANGING SPACERS AT FIXED POINTS, LIQUID CRYSTAL DEVICE, METHOD OF MANUFACTURING LIQUID CRYSTAL DEVICE, AND ELECTRONIC APPARATUS

(75) Inventors: Takehito Washizawa, Suwa (JP); Yoshitomo Hirata, Toyoshina-machi (JP); Emiko Onizuka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 183 days.

(21) Appl. No.: 10/660,616

(22) Filed: Sep. 12, 2003

(65) Prior Publication Data

US 2004/0109126 A1 Jun. 10, 2004

(30) Foreign Application Priority Data

Oct. 25, 2002 (JP) ............................. 2002-311107

(51) Int. Cl.
*G02F 1/13* (2006.01)

(52) U.S. Cl. ....................................... 349/187; 349/155

(58) Field of Classification Search ................. 349/155
See application file for complete search history.

(56) References Cited

U.S. PATENT DOCUMENTS

| 5,486,941 | A | * | 1/1996 | Saiuchi et al. ............... 349/155 |
| 5,617,228 | A | * | 4/1997 | Watanabe et al. ............. 349/19 |
| 5,643,471 | A | * | 7/1997 | Onishi et al. .................. 216/23 |
| 5,946,069 | A | * | 8/1999 | Toko ........................... 349/155 |
| 5,984,470 | A | * | 11/1999 | Sakino et al. ................ 347/106 |
| 6,063,194 | A | * | 5/2000 | Poliniak et al. ............. 118/623 |
| 6,702,419 | B1 | * | 3/2004 | Stoessel et al. ................ 347/19 |
| 6,810,919 | B1 | * | 11/2004 | Seki et al. ....................... 141/1 |
| 2002/0093617 | A1 | * | 7/2002 | Matsuyama et al. ......... 349/156 |
| 2002/0140893 | A1 | * | 10/2002 | Yi et al. ....................... 349/155 |
| 2003/0002005 | A1 | * | 1/2003 | Utsumi et al. ............... 349/155 |
| 2003/0058399 | A1 | * | 3/2003 | Miyashita .................... 349/156 |
| 2003/0184702 | A1 | * | 10/2003 | Tateno et al. ................ 349/155 |
| 2004/0005182 | A1 | * | 1/2004 | Gaylo et al. ................. 400/283 |
| 2004/0201818 | A1 | * | 10/2004 | Yamamoto et al. .......... 349/187 |

FOREIGN PATENT DOCUMENTS

| JP | 04301621 A | * | 10/1992 |
| JP | 09105946 A | * | 4/1997 |
| JP | 09292620 A | * | 11/1997 |
| JP | A-11-024083 | | 1/1999 |
| JP | A 2001-188235 | | 7/2001 |
| JP | A 2002-072218 | | 3/2002 |
| JP | A-2002-207217 | | 7/2002 |

* cited by examiner

OTHER PUBLICATIONS

Hasegawa et al (JP 02-289822) translated abstract.*

*Primary Examiner*—Andrew Schechter
*Assistant Examiner*—Lucy Chien
(74) *Attorney, Agent, or Firm*—Oliff & Berridge, PLC

(57) ABSTRACT

An apparatus is provided to arrange spacers at fixed points, a liquid crystal device, a method of manufacturing the liquid crystal device, and an electronic apparatus with the liquid crystal device. It is an object to precisely arrange spacers without using a highly accurate nozzle head and to arrange spacers of various densities without changing the nozzle. The arrangement direction of the nozzle holes crosses the direction, which is perpendicular to the scanning direction, at a predetermined angle when the spacer dispersion solution obtained by dispersing the spacers in the solvent is discharged from the plurality of nozzle holes while the nozzle head is scanned along the predetermined scanning direction.

14 Claims, 18 Drawing Sheets

FIG. 17a  UNCOLORED SPACERS
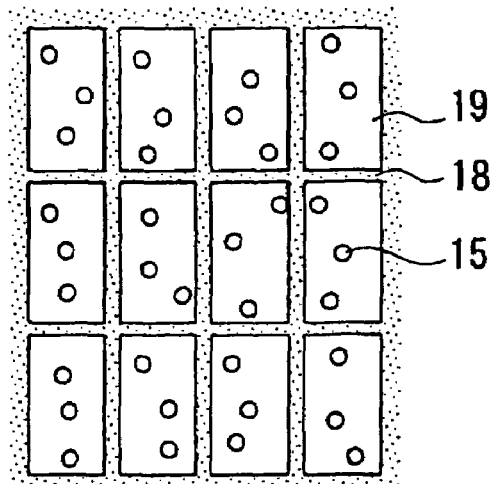
WHITE DISPLAY
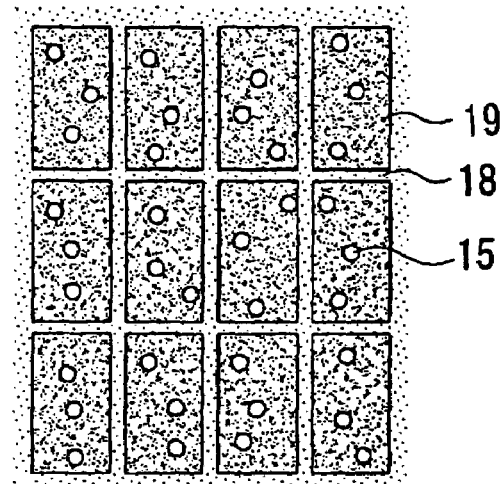
BLACK DISPLAY
FIG. 17b  COLORED SPACERS
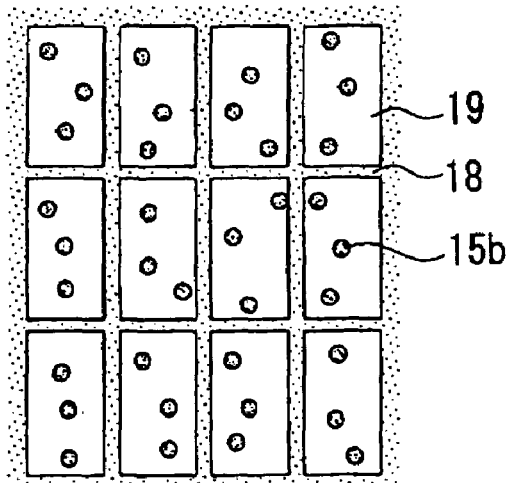
WHITE DISPLAY
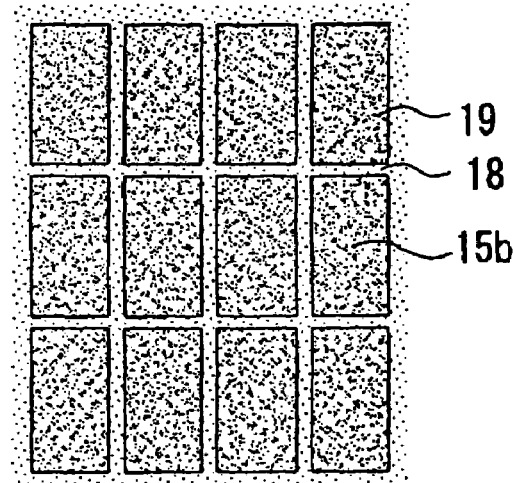
BLACK DISPLAY

APPARATUS FOR ARRANGING SPACERS AT FIXED POINTS, LIQUID CRYSTAL DEVICE, METHOD OF MANUFACTURING LIQUID CRYSTAL DEVICE, AND ELECTRONIC APPARATUS

BACKGROUND OF THE INVENTION

1. Field of Invention

The present invention relates to an apparatus for arranging spacers at fixed points, a liquid crystal device, a method of manufacturing the liquid crystal device, an electronic apparatus with the liquid crystal device, and to a technique for arranging spacers between a pair of substrates.

2. Description of Related Art

In a liquid crystal device in which a liquid crystal layer is interposed between a pair of substrates, spacers in the form of resin balls, glass balls, or resin columns are arranged between the substrates in order to keep the gap between the substrates uniform.

Generally, such a liquid crystal device is manufactured by the following processes. First, after stacking electrodes and alignment layers on both a lower substrate and an upper substrate, an aperture that functions as a liquid crystal filling hole is formed in the peripheral edge portions of the lower substrate, and an unhardened sealing material is printed on the lower substrate. Then, the spacers are arranged on the surface of the lower substrate or the upper substrate. Next, after bonding the lower substrate to the upper substrate, the sealing material is hardened to manufacture an empty liquid crystal cell. Then, liquid crystal is injected into the empty liquid crystal cell by vacuum injection method, and the filling hole is sealed by the sealing material. Finally, an optical film, such as a retardation plate or a polarizing plate, is bonded to the outer surfaces of the lower substrate and the upper substrate to manufacture the liquid crystal device.

Japanese Unexamined Patent Application Publication No. 2001-188235 discloses a process of the above manufacturing processes, in which the spacers are arranged in a specific region of the liquid crystal cell by an inkjet method. FIG. 23 is a schematic view illustrating the schematic structure of a related art inkjet device. In the related art inkjet device, a nozzle head 260 with a plurality of nozzle holes 370 is provided in a fixed direction. The nozzle holes 370 are arranged in a direction parallel to a specific side of a pixel region 19 (the direction of the X axis). A spacer dispersion liquid is discharged from the nozzle holes 370 onto the substrates in the predetermined interval b, while the nozzle head 260 is scanned in a direction perpendicular to the arrangement direction of the nozzle holes 370 (the Y direction). A dispersion medium in the spacer dispersion liquid is evaporated, and thus the spacers 15 are arranged on the substrates.

In FIG. 23, the movement locus of the nozzle holes 370 during the scanning of the head is virtually illustrated by a broken lines L (a first virtual line), and the spacers 15 are arranged in the predetermined interval b to substantially come into line with the first virtual line L.

SUMMARY OF THE INVENTION

The spacers function to keep the substrate interval uniform. However, the spacers cause light leakage or poor alignment of liquid crystal when they are arranged in the pixel regions. Therefore, the spacers are preferably arranged only in non-pixel regions 18. Thus, the arrangement interval (the nozzle interval) of the nozzle holes 370 has to be equal to the arrangement interval (the pixel interval) of the pixel regions 19, and the nozzle holes 370 have to be arranged in the non-display regions 18.

However, according to the aforementioned method, when a highly precise liquid crystal device is required, the nozzle intervals must be reduced, and high manufacturing precision is required for a nozzle head 260.

When a liquid crystal device with a different pixel structure or a different pixel size is manufactured, the nozzle head 260 with a different nozzle interval must be newly manufactured in accordance with the pixel interval a. Thus, it takes a long time to develop the nozzle head 260, and it costs a great deal.

Accordingly, an object of the present invention is to reduce or solve the above problems and to provide an apparatus for arranging spacers at fixed points, which is capable of precisely arranging the spacers without using a nozzle head with a high precision and of adjusting the arrangement density of the spacers without changing the nozzle head. Also, other objects of the present invention are to provide a liquid crystal device using such an apparatus for arranging the spacers at the fixed points, to provide a method of manufacturing the liquid crystal device, and to provide an electronic apparatus with the liquid crystal device.

To address or achieve the above objectives, there is provided an apparatus to arrange spacers at fixed points. The apparatus includes a nozzle head to discharge a spacer dispersion solution, in which the spacers are dispersed in a solvent, from a plurality of nozzle holes, while scanning along a predetermined scanning direction. The plurality of nozzle holes are arranged at a predetermined angle, with respect to the direction perpendicular to the scanning direction.

The spacers are arranged in a line along the scanning locus of the nozzle holes. A plurality of lines, along which the spacers are arranged, are formed in accordance with the number of nozzle holes. The interval of adjacent lines is determined in accordance with the interval of nozzle holes, or a tilt angle, for the scanning direction of the nozzle head. At this time, according to the present structure, because the nozzle holes are arranged at a predetermined angle for the direction perpendicular to the scanning direction, it is possible to reduce the interval of adjacent lines, as compared to the interval of the nozzle holes. Therefore, it is possible to precisely arrange the spacers using the nozzle head with the nozzle holes spaced widely apart from each other, which does not require high manufacturing precision. Thus, it is possible to effectively reduce or prevent poor display, caused by the unevenness in the thickness of the cells or the leakage of light due to the spacers, by optimizing the arrangement density of the spacers and the number of spacers per liquid drop. Thus, it is possible to improve the display quality.

An apparatus for arranging spacers at fixed points of the present invention includes a nozzle head to discharge a spacer dispersion solution, in which the spacers are dispersed in a solvent, from a plurality of nozzle holes, while scanning along a predetermined scanning direction, the nozzle head being rotatable such that the arrangement direction of the plurality of nozzle holes are inclined at a predetermined angle, with respect to the direction perpendicular to the scanning direction.

According to the present structure, it is possible to arbitrarily control the line interval of the spacers arranged in a line along the scanning direction by controlling the crossing angle between the arrangement direction of the nozzle holes and the scanning direction of the nozzle holes by rotation of the nozzle head. Thus, it is possible to arrange the spacers in various densities or in various line intervals using the nozzle head in which the interval of the nozzle holes is fixed. For example, in a liquid crystal device where the pixel regions are arranged in a matrix, when the nozzle head is scanned along the arrangement direction of the pixel regions and the nozzle holes are arranged only in the non-pixel regions extended in parallel to the arrangement direction of pixels, it is possible to increase the contrast of the liquid crystal device. As described above, according to the present structure, it is possible to easily change the line interval of spacers arranged in a line along the scanning direction. Therefore, even if the line interval of the non-pixel regions, extended in a line along the scanning direction, is reduced in response to the highly precise nozzle head, it is possible to arrange the spacers only in the non-pixel regions using a common nozzle head without changing the nozzle head.

A method of manufacturing a liquid crystal device, in which a pair of substrates is arranged to face each other with a sealing material interposed therebetween, liquid crystal and spacers are injected into a space surrounded by the pair of substrates and the sealing material, and the space is sealed, is provided according to the present invention. The method is characterized by arranging the nozzle holes in the aforementioned apparatus to arrange the spacers at fixed points inclined at a predetermined angle with respect to the direction perpendicular to the scanning direction, intermittently discharging a spacer dispersion solution from the nozzle holes onto any one substrate of the pair of substrates while the nozzle head is scanning the one substrate along the scanning direction.

According to the present manufacturing method, it is possible to reduce the line interval of the spacers arranged on the substrates in a line as compared with the interval of nozzle holes. Therefore, it is possible to precisely arrange the spacers using the nozzle head, which is provided with nozzle holes spaced widely apart from each other and does not require a high manufacturing precision, thereby optimizing the arrangement density of the spacers from the viewpoint of the thickness uniformity of the cells.

Furthermore, in the step of intermittently discharging the spacer dispersion solution, the discharge interval of the spacer dispersion solution is desirably larger than the diameter of the spacer dispersion solution discharged onto the substrate.

Since the spacers, in the spacer dispersion solution discharged onto the substrate, are gathered in the middle of the liquid drop to be arranged in a line along the scanning direction, as the solvent in the peripheral portion of the solution evaporates, it is important that liquid drops discharged onto the substrate exist separately from each other. If a plurality of liquid drops are fused with each other, the spacers tend to fluctuate their positions and do not necessarily stay in the middle of the respective liquid drops. However, it is possible to securely locate the spacers in the middle of the liquid drops by making the discharge interval of the spacer dispersion solution larger than the diameter of the liquid drop according to the present manufacturing method.

A liquid crystal device, in which a pair of substrates are arranged to face each other with a sealing material interposed therebetween, liquid crystal and spacers are injected into a space surrounded by the pair of substrates and the sealing material, and the space is sealed, is provided according to the present invention, one of the pair of substrates having a plurality of pixel regions and non-pixel regions formed around the pixel regions, and the spacers being arranged at a predetermined angle with respect to the arrangement direction of the pixel regions in plan view.

According to the present structure, it is possible to arrange the spacers at a predetermined angle for the arrangement direction of the pixels. Therefore, when the spacers are arranged at fixed points by an apparatus that arranges the spacers at the fixed points, such as an inkjet head as described above, it is possible to arrange the spacers only in the non-pixel regions and to optimize the arrangement density of the spacers, even if the structure of the nozzle holes of the nozzle head are designed to be flexible. Therefore, it is possible to obtain the high quality display.

In this case, it is desirable that the spacers exist in the form of a mixture of a single element and an aggregate, that the arrangement density of the spacers is 50 to 300/mm$^2$, and that the average number of spacers per liquid drop is 0.2 to 3.

The inventors of the present invention obtained the following results as a result of examining the optimal arrangement number (arrangement density) of the spacers. When the arrangement density of the spacers is 50 to 300/mm$^2$ and the average number of spacers per liquid drop is 0.2 to 3 in the form of a single element, an aggregate, or a mixture of the single element and the aggregate, it is possible to reduce or prevent the deterioration of the display quality due to the spacers and to improve the display quality.

For example, when the arrangement density of the spacers is less than 50/mm$^2$, the substrate interval is not definitely maintained by the spacers, and the thickness of the cell is significantly uneven. Therefore, the display quality significantly deteriorates. When the arrangement density of the spacers is larger than 300/mm$^2$, the so-called vacuum bubbles, which are defects, are generated in the liquid crystal at low temperature.

The reason for this is as follows: When the coefficient of thermal expansion of the liquid crystal is larger than that of the spacer, vacuum portions tend to locally generate in the liquid crystal layer at low temperature. Here, when too many spacers exist, the substrates cannot concave themselves to adapt to the pressure, and thus the vacuum portions which otherwise would be absorbed by deformation remain in the liquid crystal layer.

When the average number of the spacers, which are in the form of a single element or an aggregate, per liquid drop is less than 0.2, the points where no spacers exist in the liquid drop significantly increase. This causes unevenness in the arrangement of the spacers and in the thickness of the cell. Therefore, the display quality significantly deteriorates. When the average number of spacers per liquid drop is larger than 3, the number of spacers which exist as an aggregate is too large. Therefore, the thickness of the cell becomes uneven, and a large amount of light leakage occurs. Thus, the display quality deteriorates significantly.

The spacers are preferably arranged in the non-pixel regions. When the spacers exist in the display regions, the poor alignment of the liquid crystal and the light leakage occur, and the display quality deteriorates significantly. Therefore, it is possible to improve the display quality by arranging the spacers in the non-pixel regions that are not directly concerned in the display.

As described above, the display quality improves by arranging the spacers in the non-pixel regions. Furthermore, it is possible to reduce or prevent the poor display due to light leakage, by providing a light-shielding layer corresponding to the non-pixel regions.

In addition, the spacers may be colored. For example, in the case where the liquid crystal device is used as a display device, the light leaks from the portions where the spacers are arranged, thereby making the originally dark portions displayed white (displayed bright). However, it is possible to ensure the execution of the black display (dark display) using the colored spacers, in particular, blackened spacers.

The process for controlling the alignment of the liquid crystal may be performed on the surfaces of the spacers. That is, even under conditions where the alignment disorder of the liquid crystal occurs around the surfaces of the spacers and thus the contrast deteriorates, it is possible to align the liquid crystal around the surfaces of the spacers by providing an alignment assisting agent on the surfaces of the spacers. As a result, it is possible to prevent the generation of the light leakage and to provide a liquid crystal device without deterioration of contrast. A long-chain alkyl group may be provided on the surfaces of the spacer using, for example, a silane coupling agent as the alignment assisting agent.

Furthermore, a fixing layer for fixing the spacers to the substrates may be provided on the surfaces of the spacers. For example, a thermosetting resin may be used for the fixing layer.

It is possible to stably fix the spacers to the substrates by providing the thermosetting resin on the surfaces of the spacers, arranging the spacers in predetermined positions between the substrates, and performing thermal treatment. Thus, it is possible to reduce or prevent the spacers from floating and deviating from the predetermined positions thus deteriorating the uniformity of a gap and damaging the alignment layer.

The electronic apparatus of the present invention includes, for example, a liquid crystal display device according to the present invention as the display device. By using the liquid crystal display device of the present invention, it is possible to provide the electronic apparatus fitted with a display part having a high display quality due to evenness in the gap.

BRIEF DESCRIPTION OF THE DRAWINGS

FIG. 5(a) illustrates a state right after a solvent is discharged. FIG. 5(b) illustrates a state after a solvent evaporates.

FIG. 16(a) illustrates an example when an alignment controlling film is not formed in the spacer. FIG. 16(b) illustrates an example when an alignment controlling film is formed in the spacer.

FIGS. 17(a) and 17(b) are schematics explaining the result of using the spacer in FIG. 15. FIG. 17(a) illustrates an example when a transparent spacer is used. FIG. 17(b) illustrates an example when a colored spacer is used.

FIG. 20(a) illustrates a state right after the spacer dispersion solution is discharged. FIG. 20(b) illustrates the arrangement of the spacers after drying the solvent.

DETAILED DESCRIPTION OF PREFERRED EMBODIMENTS

Exemplary embodiments of the present invention will now be described with reference to the drawings.

Liquid Crystal Device

Figure 1:
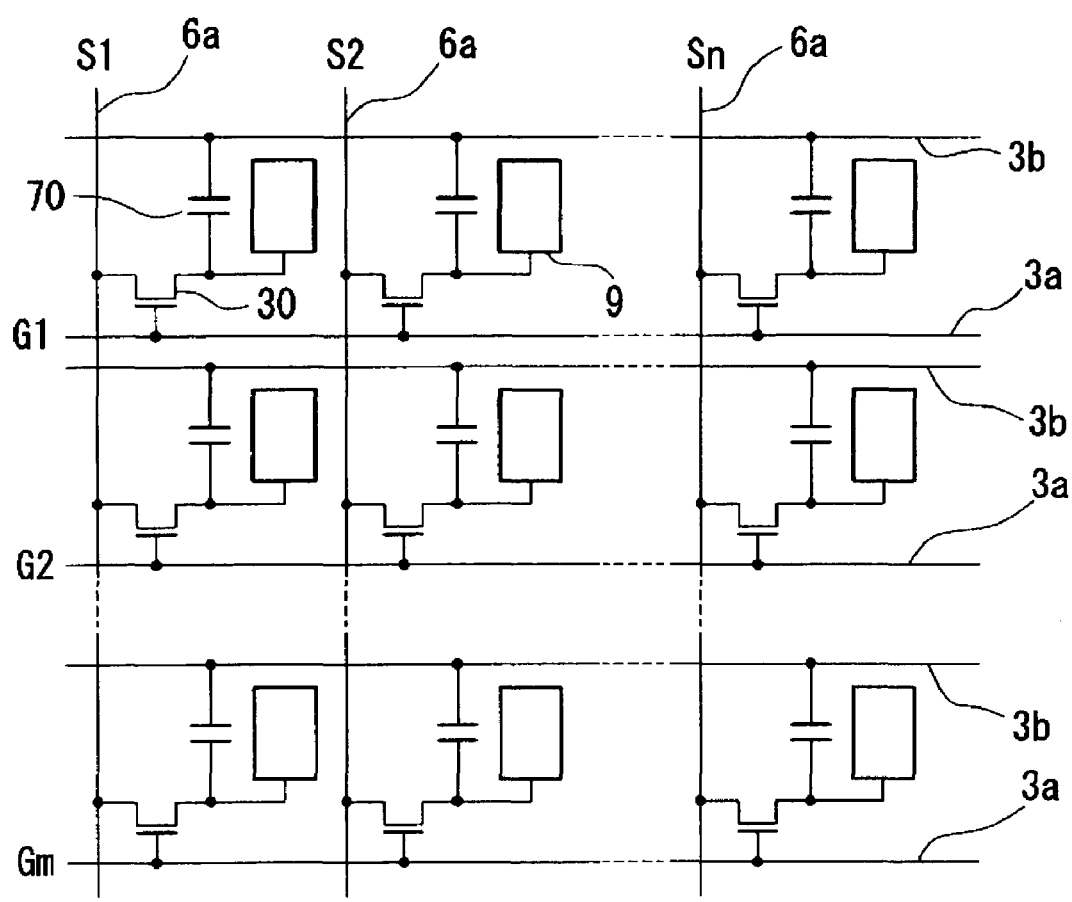
FIG. 1 is a schematic circuit diagram of switching elements and signal lines in a liquid crystal device according to an exemplary embodiment of the present invention.
Figure 2:
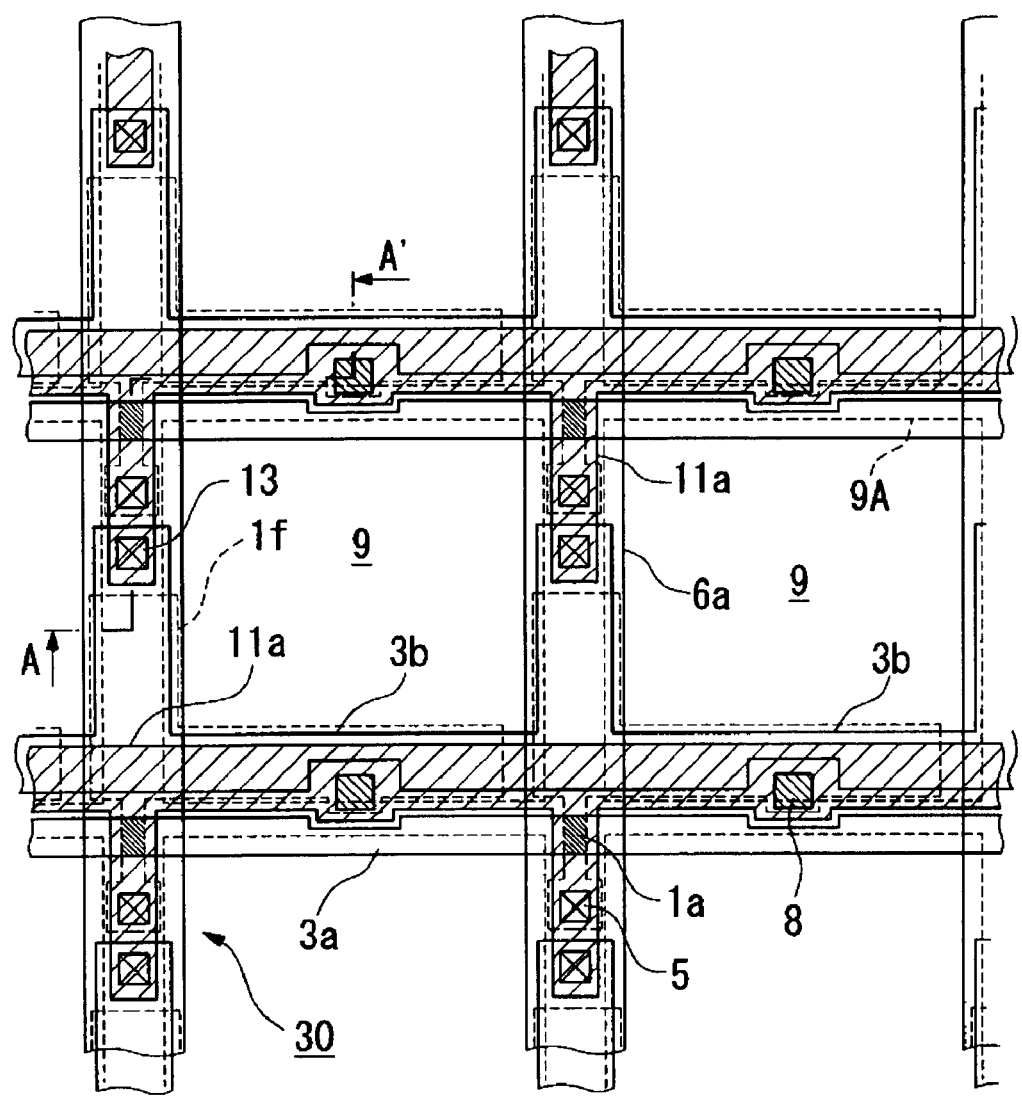
FIG. 2 is a plan view illustrating the structure of a plurality of pixel groups adjacent to each other on a TFT array substrate in the liquid crystal device.
Figure 3:
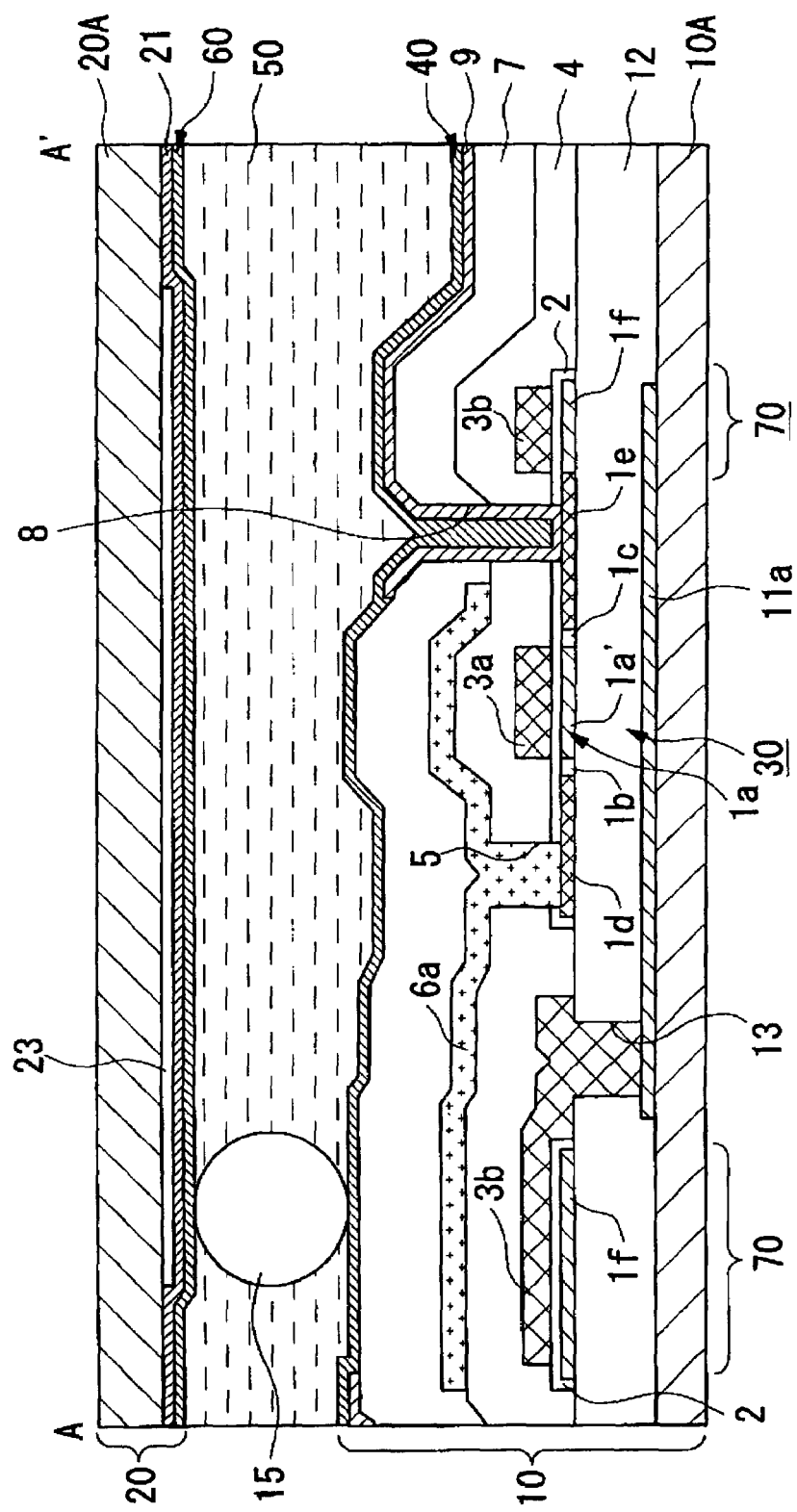
FIG. 3 is a sectional view illustrating the structure of a non-pixel region in the liquid crystal device.
Figure 4:
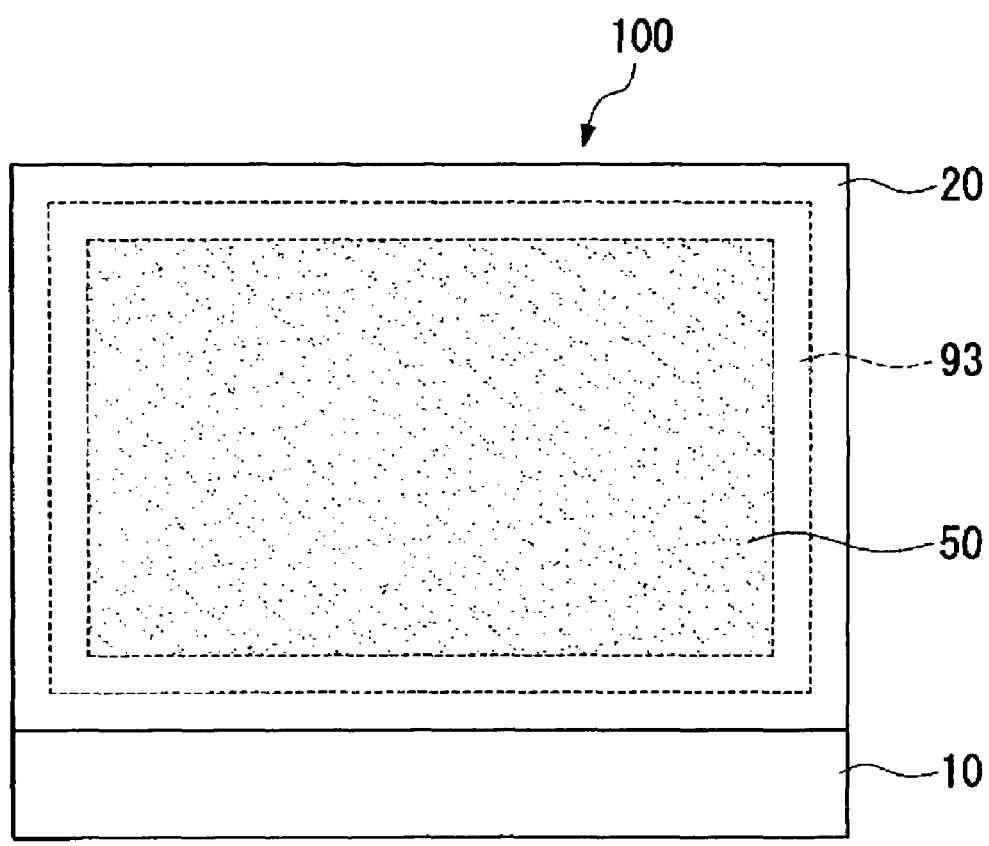
FIG. 4 is a schematic plan view illustrating the entire structure of the liquid crystal device.

A liquid crystal device according to the present exemplary embodiment, which is mentioned hereinafter, is a transmissive liquid crystal device in an active matrix using TFT (thin film transistor) elements as switching elements. FIG. 1 is a schematic circuit diagram of switching elements and signal lines of a plurality of pixels, which are arranged in a matrix in the transmissive liquid crystal device according to the present exemplary embodiment. FIG. 2 is a plan view of a main portion illustrating the structure of a plurality of pixel groups adjacent and connected to each other in a TFT array substrate, in which data lines, scanning lines, and pixel electrodes are formed. FIG. 3 is a sectional view taken along the plane A—A' of FIG. 2. FIG. 4 is a plan view illustrating the planar structure of the entire transmissive liquid crystal device according to the present exemplary embodiment. In FIG. 3, the upper side is a light incidence side, and the lower side is an observer side. Also, in the respective drawings, the reduced scale of each layer and member differs from the actual scale because each layer and member is scaled to be recognizable in the drawings.

According to the liquid crystal device of the present exemplary embodiment, as illustrated in FIG. 1, pixel electrodes 9 and TFT elements 30, which are switching elements to control the flow of current to the corresponding pixel electrodes 9, are formed in each of a plurality of pixels arranged in a matrix. Data lines 6*a*, to which image signals are supplied, are electrically connected to the sources of the corresponding TFT elements 30. The image signals, S1, S2, . . . , Sn to be recorded in the data lines 6*a*, are sequentially supplied to data lines in order of S1, S2, . . . , Sn or are supplied to each group of the plurality of data lines 6*a* adjacent and connected to each other.

Furthermore, scanning lines 3*a* are electrically connected to the gates of the TFT elements 30. Scanning signals G1, G2, . . . , Gm are periodically and sequentially applied to the plurality of scanning lines 3*a* at a predetermined timing. The pixel electrodes 9 are electrically connected to the drains of the TFT elements 30. When turning on the TFT elements 30, which are the switching elements, for a predetermined period of time, the image signals S1, S2, . . . , Sn supplied from the data lines 6*a* are recorded in the pixels at the predetermined timing.

The image signals S1, S2, . . . , Sn of a predetermined level, which are recorded in the liquid crystal through the pixel electrodes 9, are held between the pixel electrodes 9 and common electrodes, which are described later, for a predetermined period of time. The liquid crystal modulates light and enables gradation display by changing the alignment or the order of sets of molecules in the liquid crystal by an applied voltage level. In order to reduce or prevent the held image signals from leaking, storage capacitors 70 are added in parallel with the liquid crystal capacitors between the pixel electrodes 9 and the common electrodes.

Next, the planar structure of the main portion of the liquid crystal device according to the present exemplary embodiment will now be described referring to FIG. 2. As illustrated in FIG. 2, the plurality of rectangular pixel electrodes 9 (whose outlines are illustrated by dotted line portions 9A), which are made of a transparent conductive material such as ITO (indium tin oxide), are provided in a matrix on a TFT array substrate. The data lines 6*a*, the scanning lines 3*a*, and capacitance lines 3*b* are provided along the horizontal and vertical boundaries of the pixel electrodes 9. The pixel electrodes 9 are electrically connected to the TFT elements 30, which are positioned corresponding to the intersection portions between the scanning lines 3*a* and the data lines 6*a*, to display the respective pixels.

In this specification, regions in which the pixel electrodes 9 are formed are referred to as pixels or pixel regions. Regions not participating in display, in which wiring lines, such as the data lines 6*a*, the scanning lines 3*a*, and the capacitance lines 3*b*, or the TFT elements 30 are formed (regions other than the pixel regions), are referred to as non-pixel regions.

The data lines 6*a* are electrically connected to source regions (which are mentioned later) in semiconductor layers 1*a* made of, for example, a poly-silicon film, which form the TFT elements 30, through contact holes 5. The pixel electrodes 9 are electrically connected to drain regions (which are mentioned later) in the semiconductor layers 1*a* through contact holes 8. Furthermore, the scanning lines 3*a* are arranged to face channel regions (which are mentioned later) (regions marked with top-left to bottom-right oblique lines) in the semiconductor layers 1*a*. The scanning lines 3*a* function as gate electrodes in portions that face the channel regions.

The capacitance lines 3*b* include main lines (first regions formed along the scanning lines 3*a* in plan view) extended substantially straight along the scanning lines 3*a*, and protrusions (second regions extended along the data lines 6*a* in plan view) protruding toward the front ends (the upper direction in the drawing) along the data lines 6*a* in the intersection portions between the capacitance lines 3*b* and the data lines 6*a*.

First light-shielding films 11*a* are provided in a portion of the non-pixel regions, that is, regions marked with oblique lines.

The sectional structure of the liquid crystal device according to the present exemplary embodiment will now be described referring to FIG. 3. As mentioned above, FIG. 3 is a sectional view taken along the plane A—A' of FIG. 2 and illustrates the structure of a region, in which the TFT element 30 is formed. In the liquid crystal device according to the present exemplary embodiment, a liquid crystal layer 50 is interposed between a TFT array substrate 10 and a counter substrate 20 opposite to the TFT array substrate 10.

The TFT array substrate 10 includes a substrate main body 10A made of a light transmitting material such as quartz, the TFT element 30 formed on the surface of the liquid crystal layer 50, the pixel electrode 9, and an alignment layer 40. The opposing substrate 20 includes a substrate main body 20A made of a light transmitting material such as glass and quartz, a common electrode 21 formed on the surface of the liquid crystal layer 50, and an alignment layer 60. The interval (gap) between the substrates 10 and 20 is kept constant by the spacer 15. In FIG. 3, it is illustrated that a single spacer 15 exists above the data line 6*a*. However, according to the present exemplary embodiment, the spacers 15 are arranged in the non-pixel regions in a mixed state of a single spacer and an aggregate thereof.

In the TFT array substrate 10, the pixel electrode 9 is formed on the surface of the liquid crystal layer 50 of the substrate main body 10A. The pixel switching TFT element 30 for switching the pixel electrode 9 is provided in a position adjacent to the pixel electrode 9. The pixel switching TFT element 30 with a LDD (lightly doped drain) structure includes the scanning line 3*a*, a channel region 1*a*' of the semiconductor layer 1*a*, where a channel is formed by an electric field from the corresponding scanning line 3*a*, a gate insulating film 2 for insulating the scanning line 3*a* from the semiconductor layer 1*a*, the data line 6*a*, a low density source region 1*b* and a low density drain region 1*c* of the semiconductor layer 1*a*, and a high density source region 1*d* and a high density drain region 1*e* of the semiconductor layer 1*a*.

A second interlayer insulating film 4 is formed on the substrate main body 10A including the scanning line 3*a* and the gate insulating film 2. A contact hole 5 that leads to the high density source region 1*d* and a contact hole 8 that leads to the high density drain region 1*e*, is formed in the second interlayer insulating film 4. The data line 6*a* is electrically connected to the high density source region 1*d* through the contact hole 5 that passes through the second interlayer insulating film 4.

Furthermore, a third interlayer insulating film 7 is formed on the data line 6*a* and the second interlayer insulating film 4, and a contact hole 8 that leads to the high density drain region 1*e* is formed in the third interlayer insulating film 7. The high density drain region 1*e* is electrically connected to the pixel electrode 9 through the contact hole 8 that passes through the second interlayer insulating film 4 and the third interlayer insulating film 7.

According to the present exemplary embodiment, the gate insulating film 2, extended from a position that faces the scanning line 3*a*, is used as a dielectric film. The extended semiconductor film 1*a* is used as a first storage capacitor electrode 1*f*. Furthermore, a portion of the capacitance line 3b that faces the first storage capacitor electrode 1f is used as a second storage capacitor. As a result, the storage capacitor 70 is formed.

In the surface of the liquid crystal layer 50 of the substrate main body 10A of the TFT array substrate 10, the first light shielding film 11a is provided in a region in which the pixel switching TFT element 30 is formed. The first light shielding film 11a functions to prevent the reflection light from the liquid crystal layer 50, which transmits the TFT array substrate 10 and is reflected from a surface under the TFT array substrate 10 (an interface between the TFT array substrate 10 and air), from being incident to at least the channel region 1a', the low density source region 1b, and the drain region 1c of the semiconductor layer 1a.

A first interlayer insulating film 12, which electrically insulates the semiconductor layer 1a that forms the pixel switching TFT element 30 from the first light shielding film 1a, is provided between the first light shielding film 1a and the pixel switching TFT element 30. Furthermore, as illustrated in FIG. 2, the first light shielding film 11a is formed on the TFT array substrate 10, and the first light shielding film 11a is electrically connected to the capacitance line 3b, which is formed in the front or rear end of the first light shielding film 11a, through a contact hole 13.

Furthermore, an alignment film 40, which controls the alignment of liquid crystal molecules in the liquid crystal layer 50 when no voltage is applied, is formed on the outermost surface of the liquid crystal layer 50 of the TFT array substrate 10, that is, on the pixel electrode 9 and the third interlayer insulating film 7. Therefore, in the region in which the TFT element 30 is formed, a plurality of convexes, concavities and step differences are formed on the outermost surface of the liquid crystal layer 50 of the TFT array substrate 10, that is, on the interposed surface of the liquid crystal layer 50.

Meanwhile, a second light shielding film 23 is formed in a region that opposes the region, in which the data line 6a, the scanning line 3a, and the pixel switching TFT element 30 are formed (the non-pixel region), in the surface of the liquid crystal layer 50 of the substrate main body 20A in the opposing substrate 20. The second light shielding film 23 reduces or prevents incident light from transmitting to the channel region 1a', the low density source region 1b, or the low density drain region 1c of the semiconductor layer 1a of the pixel switching TFT element 30. Furthermore, the common electrode 21 made of ITO is formed over the almost entire surface of the liquid crystal layer 50 of the substrate main body 20A, on which the second light shielding film 23 is formed. An alignment film 60, which controls the alignment of the liquid crystal molecules in the liquid crystal layer 50 when no voltage is applied, is formed on the liquid crystal layer 50.

FIG. 4 is a schematic plan view illustrating an example of the entire structure of a liquid crystal device 100 according to the present exemplary embodiment. As illustrated in FIG. 4, in the liquid crystal device 100 according to the present exemplary embodiment, the liquid crystal layer 50 is formed by filling the liquid crystal in a region sealed by a closed-ring-shaped sealing material 93 between the TFT array substrate 10 and the opposing substrate 20. According to the present exemplary embodiment, a method of dropping a liquid crystal drop is used as a method of filling the liquid crystal between the substrates. Thus, the liquid crystal is dropped on the substrate, and both substrates 10 and 20 are connected to each other to form the liquid crystal layer 50.

As mentioned above, the spacers 15 are arranged in the non-pixel regions between the substrates 10 and 20 in order to maintain a gap. The spacers 15 are in the form of a single element or an aggregate. The arrangement density is preferably 50 to 300/mm$^2$ in a region inside the sealing material 93 illustrated in FIG. 4. Also, the average number of spacers per liquid drop is preferably 0.2 to 3 in the above state.

Figure 12:
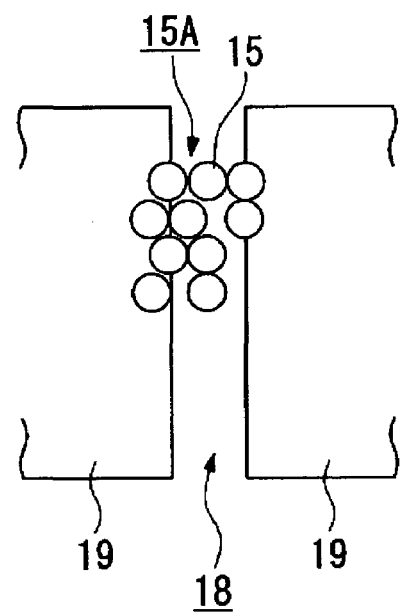
FIG. 12 is a plan view illustrating a state where an aggregate of spacers is formed in the spacer arranging process of the liquid crystal device.

The reason for this is as follows. When the arrangement density of the spacers 15 is less than 50/mm$^2$ for example, the substrate interval is not sufficiently maintained by the spacers 15, and the thickness of cells is significantly uneven. Thus, the display quality deteriorates. However, when the arrangement density of the spacers 15 is larger than 300/mm$^2$, a defect called vacuum bubbles is generated at low temperature. When the average number of spacers per liquid drop is less than 0.2, portions where no spacers 15 exist in a liquid drop significantly increase and thus the spacers 15 are unevenly arranged. Thus, the thickness of the cells is uneven, and the display quality significantly deteriorates. However, when the average number of spacers per liquid drop is larger than 3, for example, as illustrated in FIG. 12, too many spacers 15 exist in the form of an aggregate. Therefore, a large spacer aggregate 15A comes out of a non-pixel region 18 and is positioned in the pixel regions 19. As a result, the thickness of the cells becomes uneven, and the degree of light leakage and the poor alignment of the spacers become severe. Therefore, the display quality significantly deteriorates.

Figure 5A:
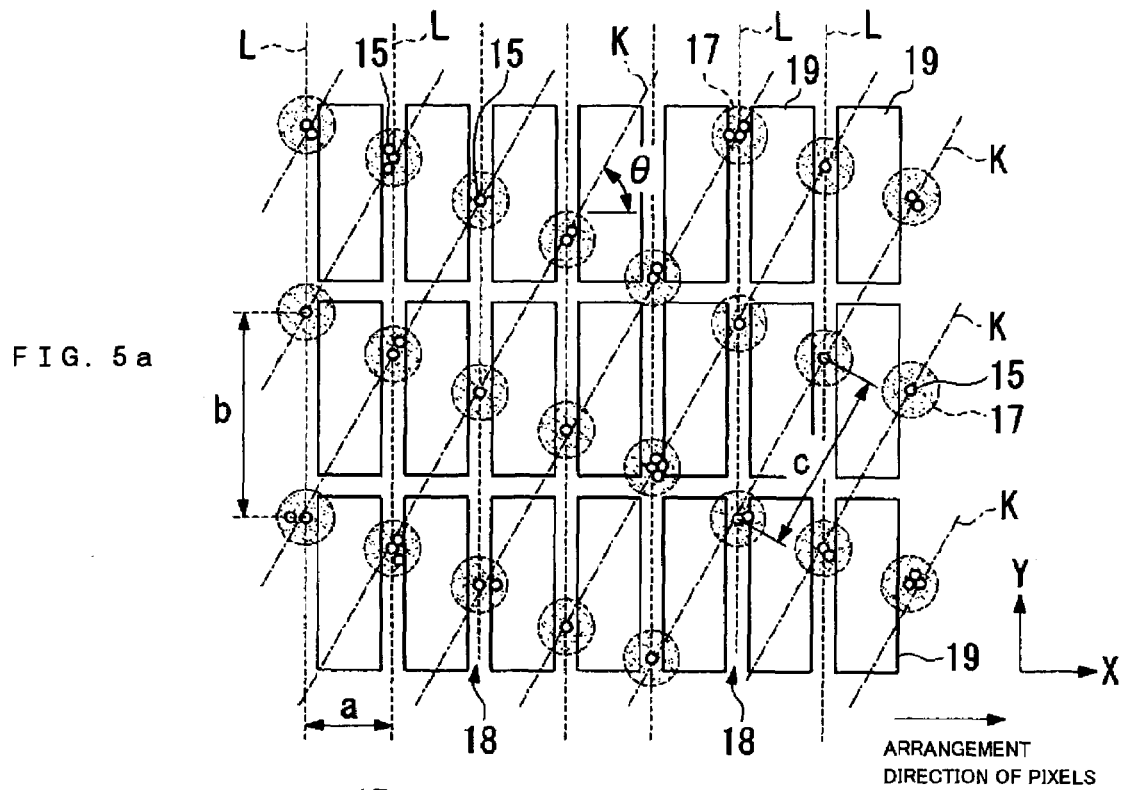
FIGS. 5(a) and 5(b) are plan views illustrating examples of a state where the average number of spacers per liquid drop is two in the spacer arranging process of the liquid crystal device.
Figure 5B:
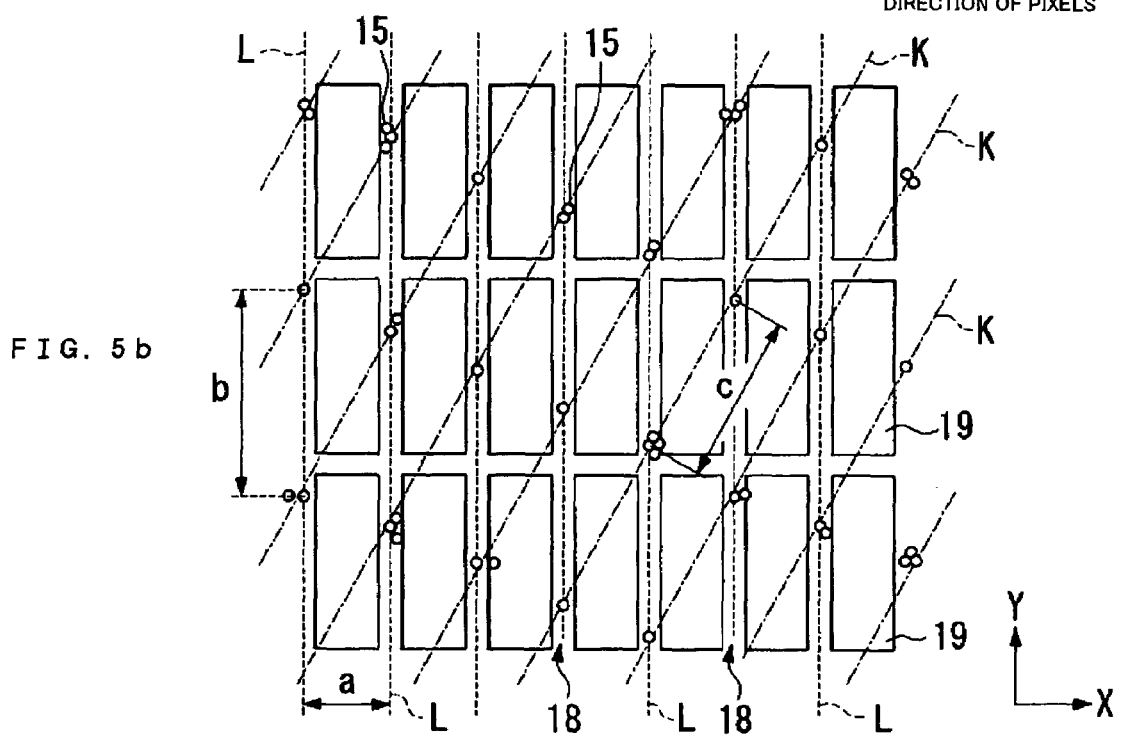

FIGS. 5(a) and 5(b) illustrate the arrangement of the spacers 15 inside the substrates. It shows that two spacers per liquid drop 17 exist on average when the spacer dispersion solution, obtained by dispersing the spacers 15 in a solvent, is discharged onto the substrates. FIG. 5(a) illustrates a state right after the spacer dispersion solution is discharged. FIG. 5(b) illustrates a state after the solvent in the spacer dispersion solution is evaporated.

As illustrated in FIGS. 5(a) and 5(b), since the spacers 15 are arranged using an apparatus for arranging the spacers at the fixed points, which is discussed hereinafter, the spacers are not irregularly arranged but are arranged in the non-pixel regions of the liquid crystal device, in which the respective end sides of the rectangular pixel regions 19 are arranged along the X axis or the Y axis, to follow a first virtual line L and a second virtual line K, which are virtually positioned in FIG. 5.

The first virtual line L shows the movement locus of the nozzle holes when the nozzle head of the apparatus for arranging the spacers at the fixed points (which will be mentioned hereinafter) is scanned in the direction of the Y axis. The second virtual line K shows the arrangement direction of the nozzle holes when the spacer dispersion solution is discharged. The spacers 15 are arranged in a predetermined interval b along a scanning direction parallel to the Y axis (that is, along the first virtual line L) and in a predetermined interval c along the second virtual line K, which is inclined at a predetermined angle with respect to the direction perpendicular to the scanning direction. That is, the second virtual line K is inclined at a predetermined angle θ with respect to the X axis. θ may have an arbitrary value. Even when the average number of spacers per liquid drop and the arrangement intervals b and c of the spacers 15 are fixed, it is possible to change the arrangement density of spacers 15 on the surface of substrate by changing θ.

When the average number of spacers per liquid drop is 0.2 this means that each of two liquid drops includes one spacer and no spacers are included in the remaining eight liquid drops among the arbitrary ten liquid drops. As clearly noted from FIG. 5, it is not possible to control the number of spacers 15 included in each liquid drop 17. For example, although the average number of spacers included in a liquid drop is 2, it does not mean that two spacers 15 are included in every liquid drop. Furthermore, the spacers 15 in a liquid drop exist in the form of a single element, an aggregate, or a mixture of the single element and the aggregate.

Figure 6:
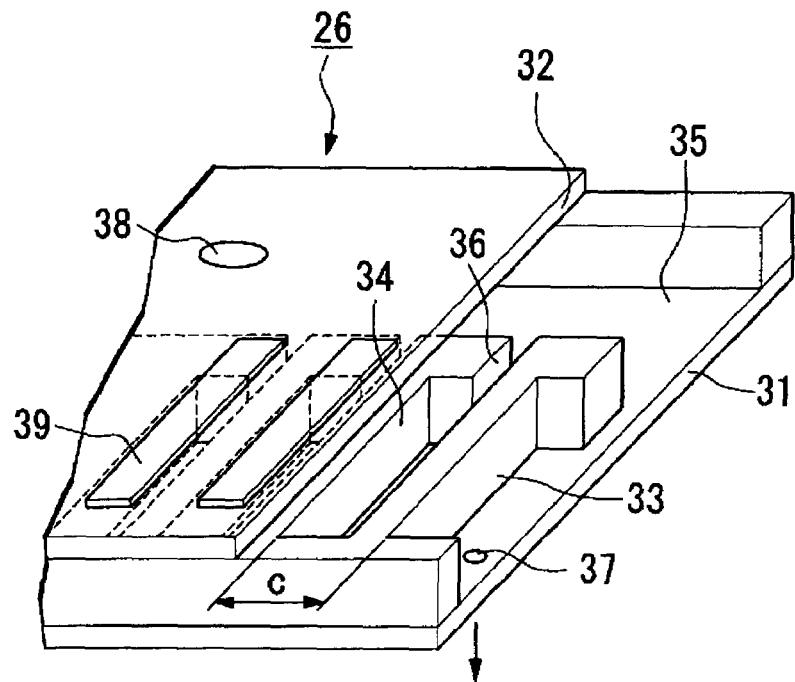
FIG. 6 is a perspective view illustrating the structure of the head of an inkjet device used in the spacer arranging process.
Figure 7:
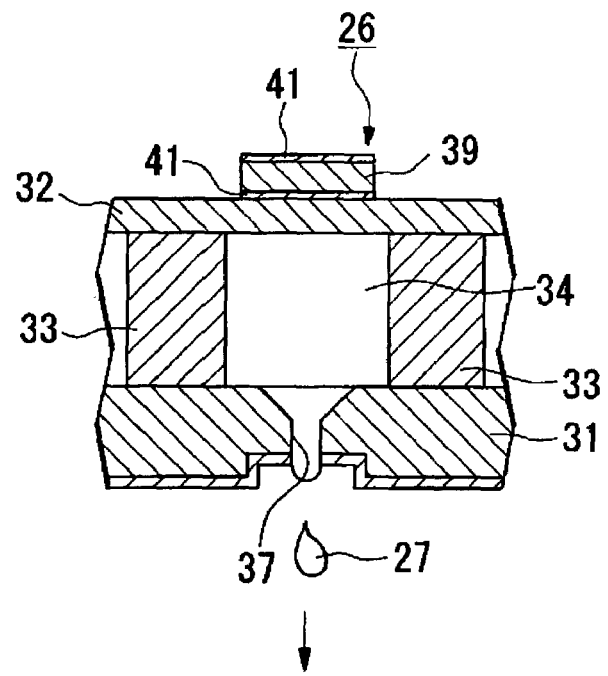
FIG. 7 is a sectional view of the head of the inkjet device.

An example of the structure of the nozzle head 26 of an inkjet device used as the apparatus for arranging the spacers at the fixed points is illustrated in FIGS. 6 and 7. As illustrated in FIG. 6, the nozzle head 26 includes a nozzle plate 31 and a diaphragm 32 that are made of stainless steel. The nozzle plate 31 and the diaphragm 32 are bonded to each other with partitions (resolver plates) 33 interposed therebetween.

A plurality of spaces 34 and a liquid collecting portion 35 are formed between the nozzle plate 31 and the diaphragm 32 by the plurality of partitions 33 arranged in a predetermined interval c. The spaces 34 and the liquid collecting portion 35 are filled with spacer dispersion solution, and the spaces 34 communicate with the liquid collecting portion 35 through supplying holes 36. The nozzle holes 37 for discharging the spacer dispersion solution from the spaces 34 are formed in the nozzle plate 31. One nozzle hole 37 is provided in each space 34. The plurality of nozzle holes 37 are longitudinally arranged in the nozzle head 26 in the predetermined interval c, to be parallel to each other in plan view.

A hole 38 to supply the spacer dispersion solution to the liquid collecting portion 35 is formed in the diaphragm 32. The spacer dispersion solution is supplied from outside in accordance with change in volume in the space 34.

As illustrated in FIG. 7, a piezoelectric sensor 39 is bonded to the surface opposite to the surface that faces the space 34 of the diaphragm 32. The piezoelectric sensor 39 is positioned between a pair of electrodes 41. When current flows through the piezoelectric sensor 39, the piezoelectric sensor 39 is curved to protrude to the outside, and at the same time, the diaphragm 32, to which the piezoelectric sensor 39 is connected, is curved to the outside. Thus, the volume of the space 34 increases. Therefore, the amount of spacer dispersion solution corresponding to the increase in the volume in the space 34 is received from the liquid collecting portion 35 through the supplying hole 36. When no current flows through the piezoelectric sensor 39, the piezoelectric sensor 39 and the diaphragm 32 return to their original shapes. Therefore, because the space 34 returns to its original volume, the pressure of the spacer dispersion solution inside the space 34 increases. Thus, a liquid drop 27 of the spacer dispersion solution is discharged from the nozzle hole 37 towards the substrate.

Figure 8:
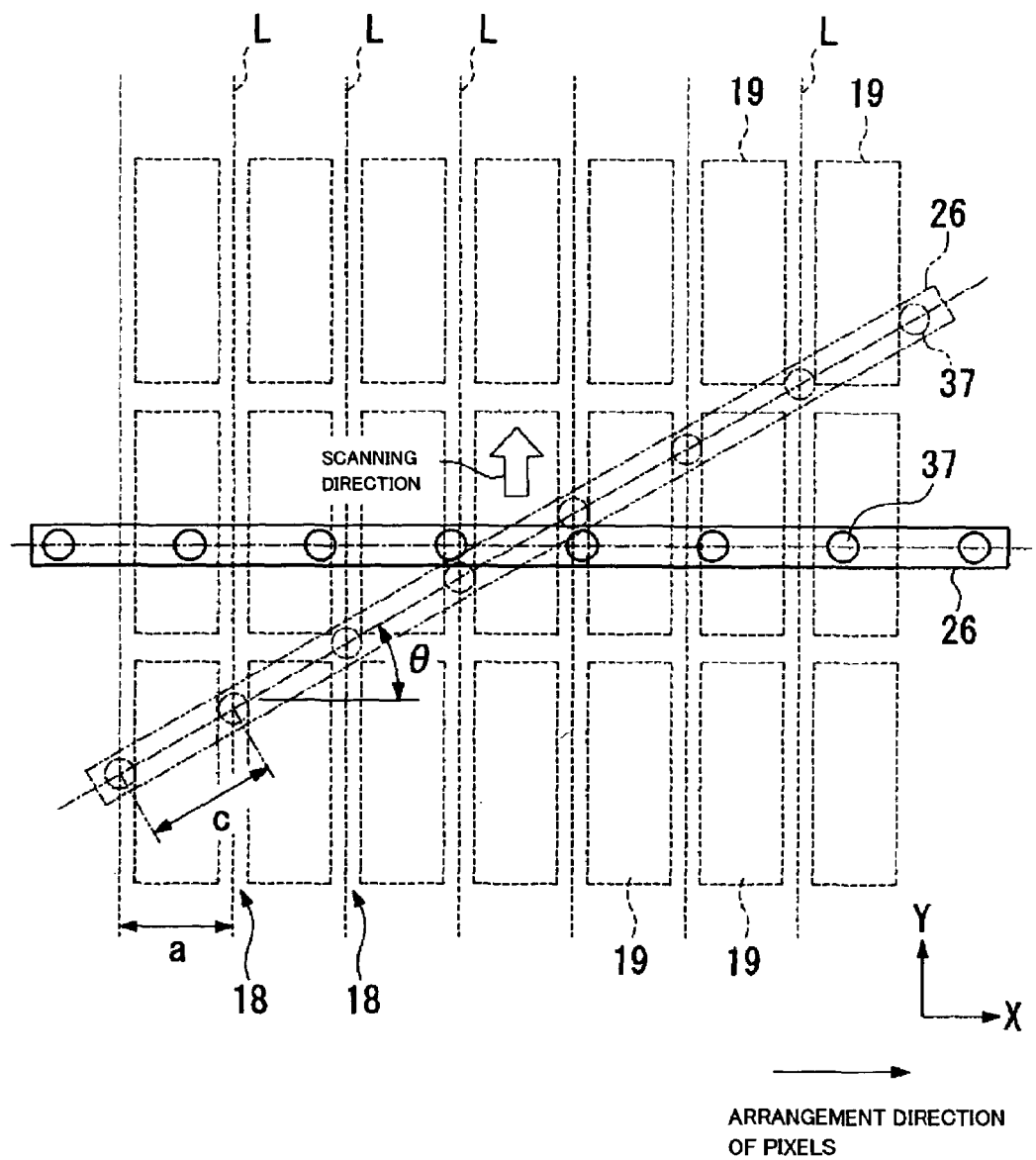
FIG. 8 is a plan view of the head of the inkjet device.
Figure 9:
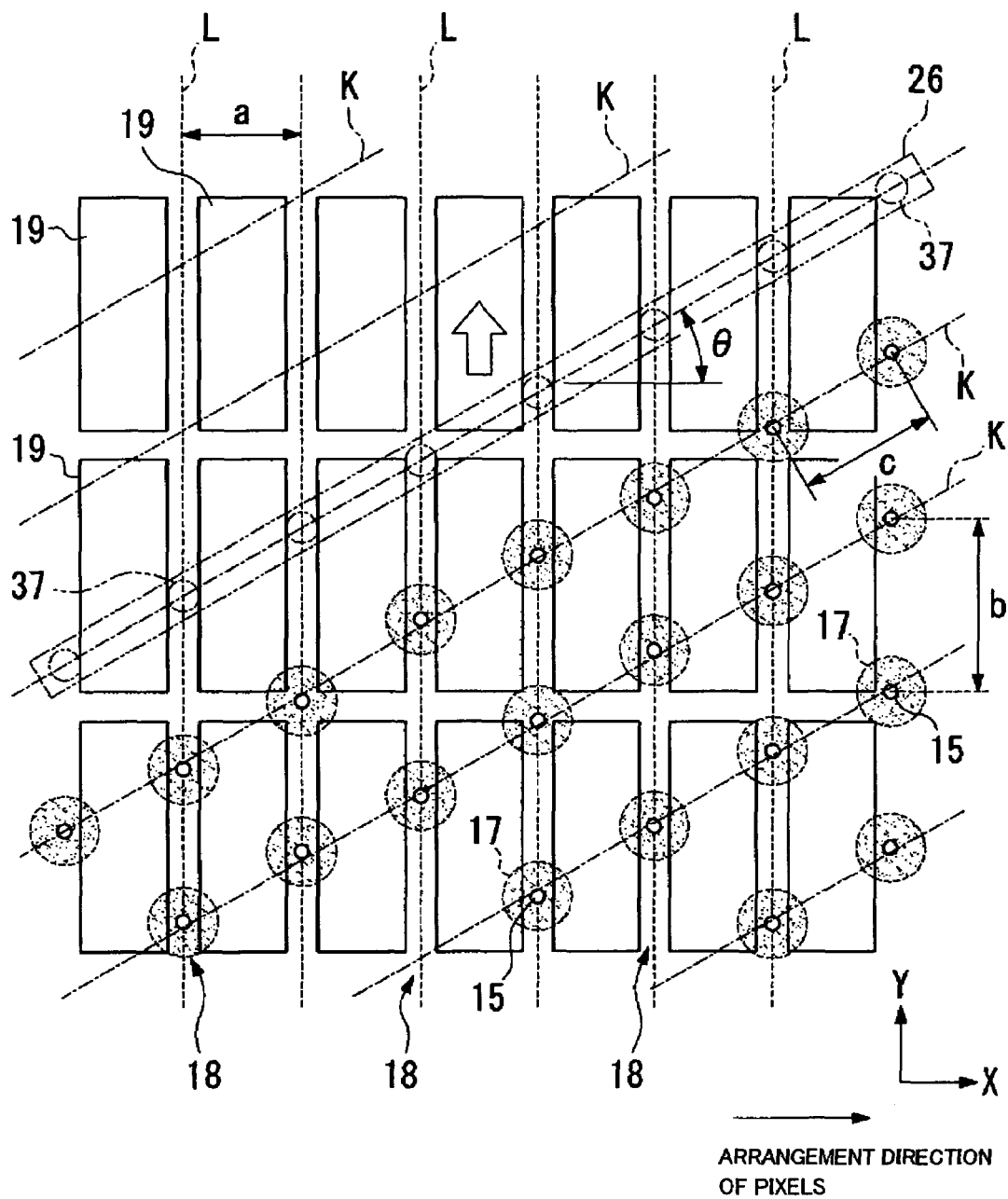
FIG. 9 is a plan view explaining the operation of the head of the inkjet device.

Furthermore, as illustrated in FIG. 8, the nozzle head 26 rotates in the surface horizontal to the substrate. The crossing angle $\theta$ between the arrangement direction of the nozzle holes 37 and the X axis can be controlled either continuously or stepwise. For example, as illustrated in FIG. 9, when the spacer dispersion solution is intermittently discharged from the nozzle hole 37 onto the substrate in the predetermined interval b while the nozzle head 26 is scanned in the direction of the Y axis, the spacers 15 are arranged in a line on the substrate along the first virtual line L parallel to the Y axis in the predetermined interval b and are arranged in a line along the second virtual line K that crosses the X axis at the angle $\theta$ (that is, parallel to the arrangement direction of the nozzle holes 37) in the predetermined interval c (that is, the arrangement interval of the nozzle holes 37).

As described above, when the arrangement direction of the nozzle holes 37 is inclined at the predetermined angle $\theta$ with respect to the direction of the X axis (that is, the direction perpendicular to the scanning direction of the nozzle head 26), the interval of the adjacent first virtual lines L is expressed by $c \cdot \cos \theta$. Therefore, when a pixel pitch a in the direction (the direction of the X axis) perpendicular to the scanning direction is set smaller than the arrangement interval c, between the nozzle holes 37 aiming at a high quality display, it is possible to ensure the arrangement of the nozzle holes 37 in the non-pixel regions 18 by controlling the angle of rotation $\theta$ of the nozzle head 26. Thus, since the spacers 15 are arranged only in the non-pixel regions 18, it is possible to obtain a high quality display with high contrast.

The discharge interval b of the spacer dispersion solution is preferably larger than the diameter of the liquid drop 17 discharged onto the substrate. The spacers 15 in the spacer dispersion solution discharged onto the substrates are gathered in the middle of the liquid drop as the solvent in the peripheral portion of the solution evaporates and are arranged along the first virtual lines L and the second virtual lines K. Therefore, it is important that the liquid drops 17 discharged onto the substrate be isolated from each other.

Figure 20A:
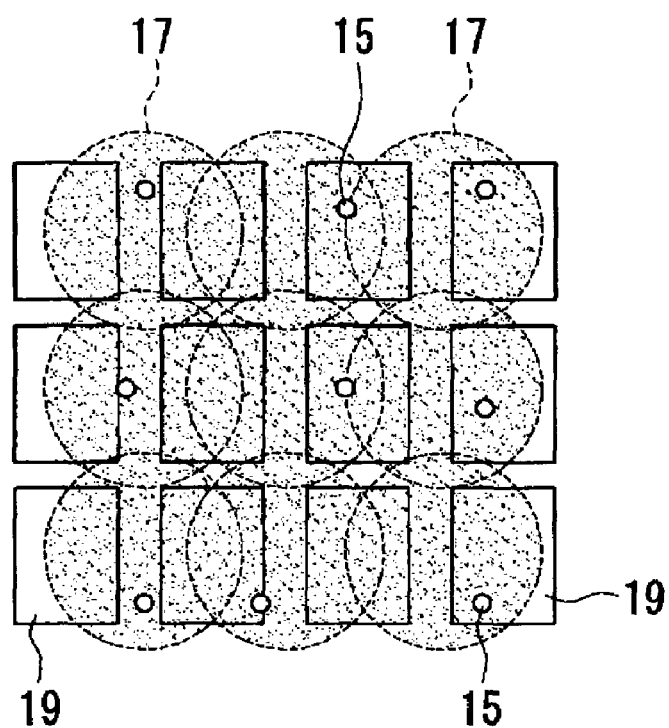
FIGS. 20(a) and 20(b) are schematics illustrating a state where a liquid drop is discharged in intervals smaller than the diameter of the liquid drop.
Figure 20B:
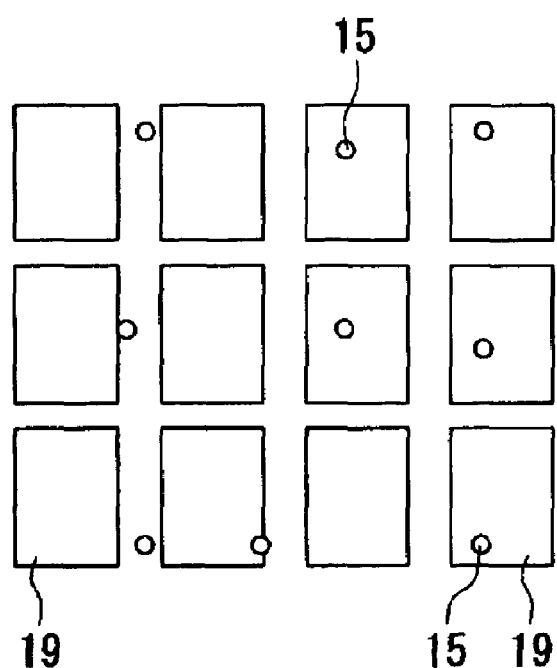

If the liquid drops 17 are discharged in an interval smaller than the diameter of the liquid drop 17 and the adjacent liquid drops 17 are fused with each other as illustrated in FIG. 20(a), the spacers 15 are not necessarily positioned in the middle of each liquid drop 17. Therefore, as illustrated in FIG. 20(b), some spacers 15 are arranged in the pixel regions 19. When the discharge interval of the liquid drop 17 is larger than the diameter of the liquid drop 17 as mentioned above, it is possible to prevent the adjacent liquid drops 17 from being fused with each other, thereby ensuring the arrangement of the spacers 15 in the middle of the liquid drop. Therefore, it is possible to arrange the spacers 15 only in the non-pixel regions 18.

Figure 10:
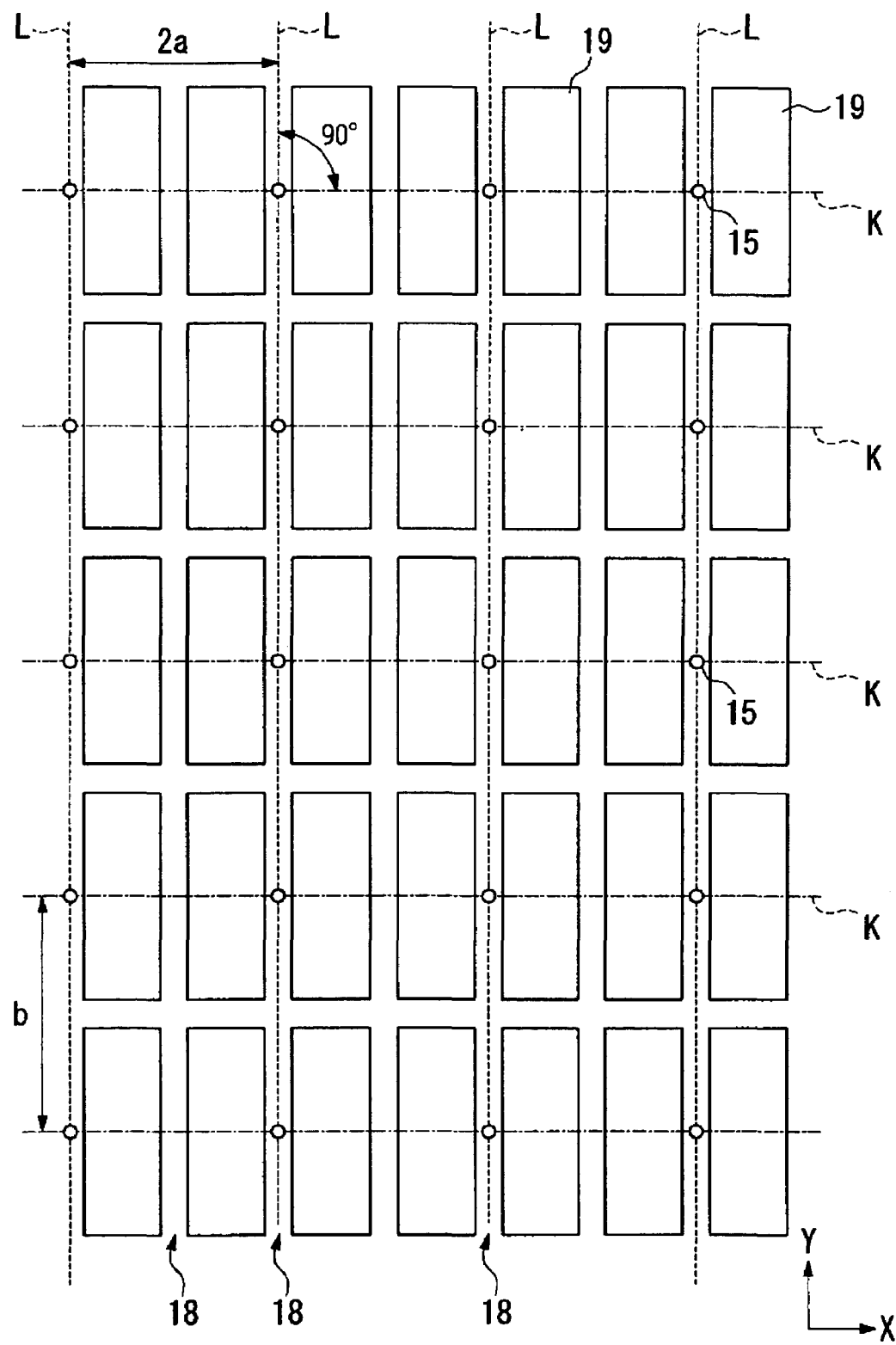
FIG. 10 is a plan view illustrating an example of the arrangement of the spacers by the head of the inkjet device.
Figure 11:
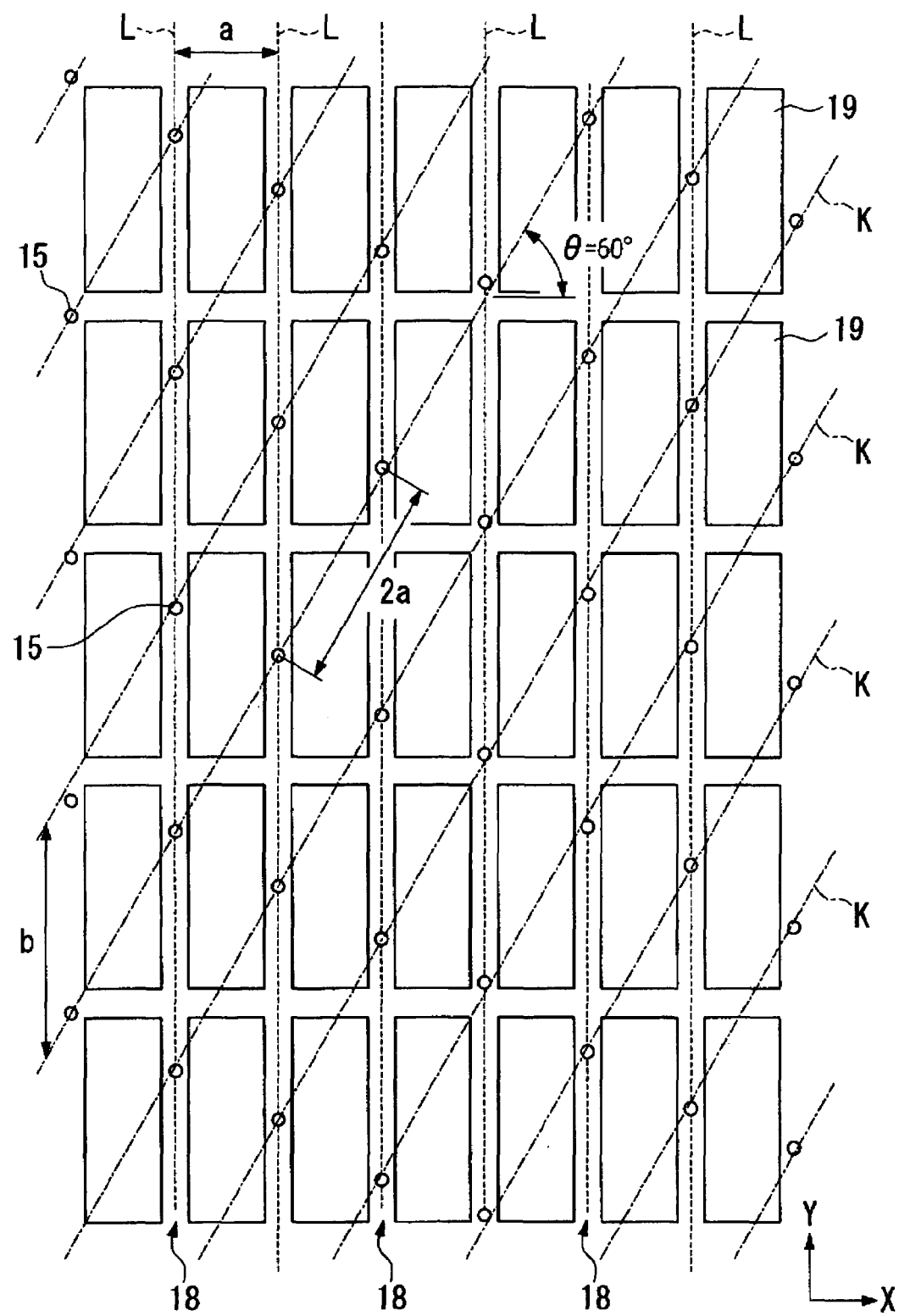
FIG. 11 is a plan view illustrating an example of the arrangement of the spacers by the head of the inkjet device.

FIGS. 10 and 11 illustrate states where the spacers 15 are arranged at fixed points along the first virtual lines L in the predetermined interval b by the nozzle head 26 with the nozzle holes 37 arranged in the interval 2a for the pixel pitch a.

FIG. 10 illustrates a state where the spacers 15 are arranged in the predetermined interval b in the direction of the Y axis assuming the crossing angle of the second virtual lines K to the X axis to be 0° (that is, a state where the arrangement direction of the nozzle holes 37 is parallel to the X axis). In FIG. 10, the spacers 15 are arranged in every other non-pixel region 18. Also, the spacers 15 are arranged only in the non-pixel regions 18, so that the spacers 15 affect the display to a minimum extent.

Meanwhile, FIG. 11 illustrates a state where the spacers 15 are arranged in the predetermined interval b in the direction of the Y axis, with the crossing angle $\theta$ between the second virtual lines K and the X-axis of 60° (that is, a state where the arrangement direction of the nozzle holes 37 is inclined at an angle of 60° with respect to the X axis). In FIG. 11, the spacers 15 are arranged in each of the non-pixel regions 18 extended in a line in the direction of the Y axis. The arrangement density of the spacers 15 is twice as large as that of the spacers 15 in FIG. 10. In this case, the spacers 15 are arranged only in the non-pixel regions 18 to reduce or prevent the light leakage from the pixel regions by the spacers 15. Furthermore, because the arrangement density of the spacers 15 is larger, the uniformity in the thickness of the cell improves.

Therefore, according to the apparatus of the present invention for arranging the spacers at the fixed points, it is possible to make the interval of the adjacent first virtual lines L smaller than the arrangement interval (the nozzle interval)

c of the nozzle holes 37 by scanning the nozzle head in a state where the arrangement direction of the nozzle holes 37 crosses the X axis. Therefore, it is possible to precisely arrange the spacers 15 without using a nozzle head 26 having a high manufacturing precision.

Moreover, it is possible to control the line intervals of the spacers 15 arranged in a line along the first virtual lines L, by rotating the nozzle head 26 on the plane horizontal to the substrate to control the crossing angle θ between the arrangement direction of the nozzle holes 37 and the X axis. Therefore, even if the demand for precision of the manufactured liquid crystal device changes, it is possible to ensure the arrangement of the spacers 15 only in the non-pixel regions 18 using the common nozzle head 26, in which the intervals of the nozzle holes is fixed, without changing the nozzle head 26.

In addition, according to the liquid crystal device of the present exemplary embodiment, it is possible to arrange the second virtual lines K at a predetermined angle with respect to the direction of the X axis, which is perpendicular to the scanning direction of the nozzle head 26. Therefore, when the spacers 15 are arranged in the fixed points by the aforementioned nozzle head 26, even if the nozzle holes 37 of the nozzle head 26 are designed to be flexible, it is possible to arrange the spacers 15 only in the non-pixel regions 18 and to optimally set the arrangement density of the spacers 15. Therefore, it is possible to obtain a high display quality. For example, it is possible to reduce or prevent the deterioration of contrast due to the light leakage by the spacers 15 and to improve the display quality by setting the arrangement density of the spacers 15 to 50 to 300/mm$^2$ and by arranging 0.2 to 3 spacers 15 in a liquid drop on the average.

According to the present exemplary embodiment, the liquid crystal device is structured on the basis of black and white display. However, in order to perform color display, a color filter layer may be formed. A color filter layer including a colored layer and a light shielding layer (black matrix), and a protecting layer to protect the color filter layer are sequentially formed inside the upper substrate (opposing substrate) 20, to form a common electrode 21 on the protecting layer. The display region includes the colored layers of, for example, red (R), green (G), and blue (B) colors. Therefore, because pixels contain the display regions of the respective colors, it is possible to perform color display in every pixel. According to the present exemplary embodiment, a liquid crystal device in an active matrix is described. However, for example, the structure according to the present invention can be used for a simple matrix type liquid crystal device.

The structure of the spacers 15 used for the liquid crystal device according to the present exemplary embodiment will now be described. The spacer 15 may be a spherical member made of silicon dioxide or polystyrene. The diameter of the spacer 15 is adjusted to the thickness (the thickness of the cell, that is the gap between the substrates) of the liquid crystal layer 50 sealed in the liquid crystal device, for example, in the range of 2 to 10 μm.

Figure 13:
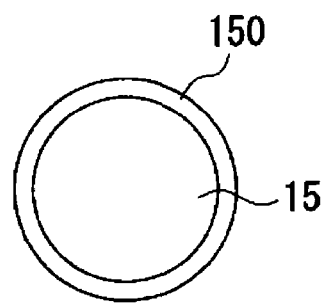
FIG. 13 is a schematic illustrating the structure of the spacer.

As illustrated in FIG. 13, a material, the spacer 15 whose surface is coated with a thermosetting resin layer 150 can be used. In this case, the spacers 15 are firmly fixed to the lower substrate (TFT array substrate) 10 and the upper substrate (the opposing substrate) 20 by the hardening of the thermosetting resin. For example, in the processes of manufacturing the liquid crystal device according to present invention, thermal treatment is performed to harden the thermosetting resin after ejecting the spacers 15 onto the substrate (the opposing substrate 20) other than the one onto which liquid crystal has been dropped (for example, the TFT array substrate 10). As a result, the spacers 15 are fixed to the opposing substrate 20.

Figure 14:
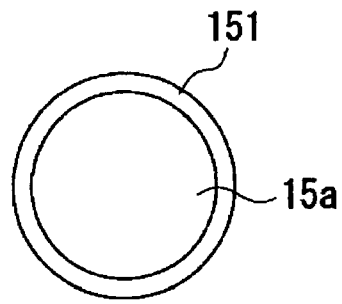
FIG. 14 is a schematic illustrating the structure when a surface-processed layer is formed on the spacer.
Figure 16A:
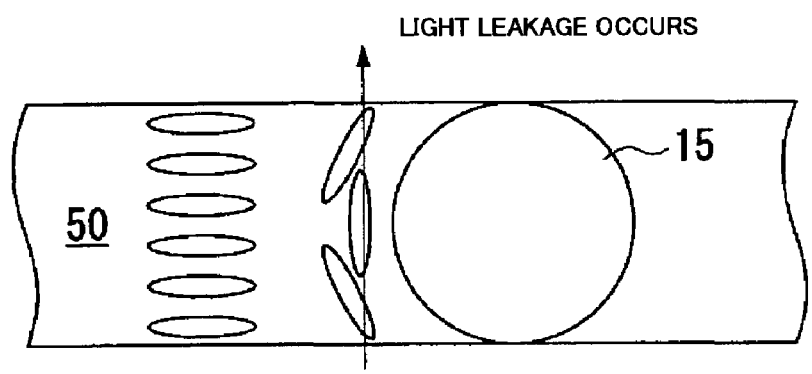
FIGS. 16(a) and 16(b) are schematics explaining the result of using the spacer in FIG. 14.
Figure 16B:
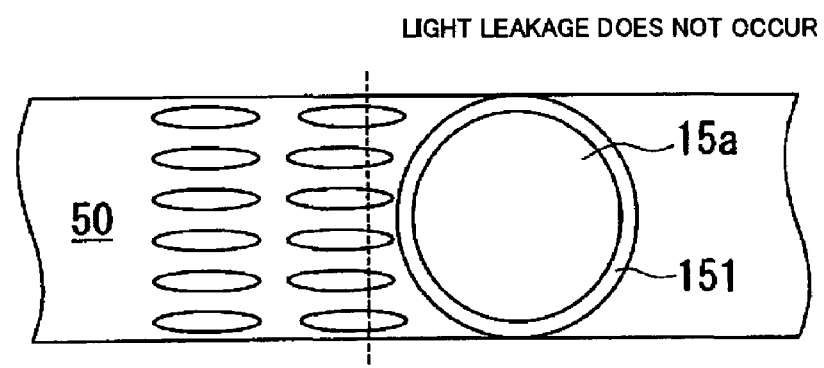

As illustrated in FIG. 14, it is possible to form a surface processing layer 151 carrying a long-chain alkyl group on the surface of the spacer 15. For example, a silane coupling agent may be used as a surface processing layer 151 carrying a long chain alkyl group. As illustrated in FIG. 16(a), when the spacer 15 without the surface processing layer 151 is used, the alignment of the liquid crystal molecules scatters around the surface of the spacer 15, and the light leakage occurs in the surface of the spacer 15a. As illustrated in FIG. 16(b), when a spacer 15a with the surface processing layer 151 is used, the liquid crystal molecules around the surface of the spacer 15a may be aligned in a predetermined direction. Thus, the liquid crystal molecules are vertically aligned, and thus the light leakage hardly occurs around the surface of the spacer 15a.

Figure 15:
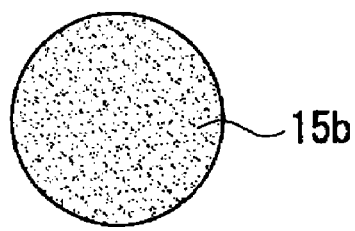
FIG. 15 is a schematic illustrating the structure of a colored spacer.

Furthermore, it is possible to color the spacers. A spacer 15b illustrated in FIG. 15 is an example of a black colored spacer. For example, as illustrated in FIG. 17(a), when the uncolored spacers 15 are used, the places corresponding to the spacers are displayed white during black display (dark display), which may cause the contrast deterioration. In contrast, as illustrated in FIG. 17(b), when the colored spacers 15b are used as illustrated in FIG. 15, the places corresponding to the spacers are not displayed white during the black display (the dark display). The places corresponding to the spacers are displayed black during white display (bright display). However, the influence of the black points displayed on the deterioration of the contrast is smaller than the influence of the white points on the deterioration of the contrast during the black display (the dark display).

Method of Manufacturing Liquid Crystal Device

An example of the method of manufacturing the liquid crystal device according to the present invention will now be described with reference to FIG. 18.

Figure 18:
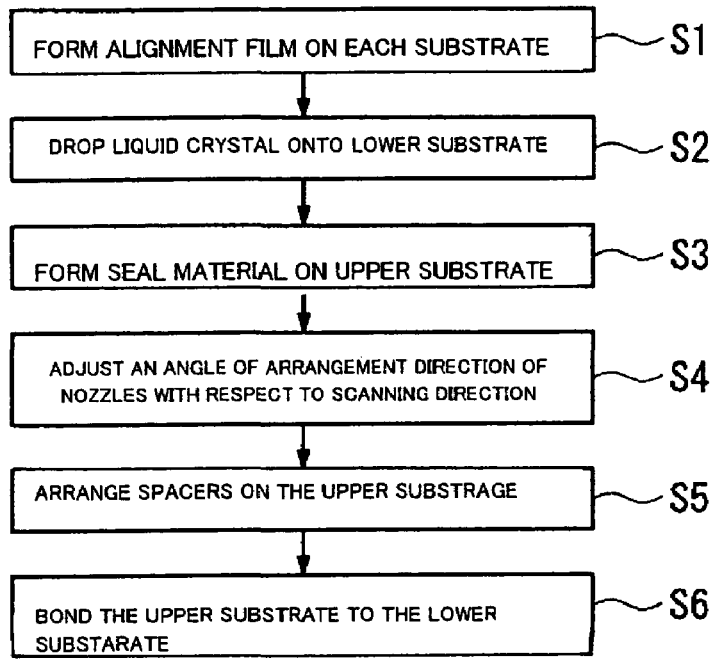
FIG. 18 is a flowchart illustrating an example of a method of manufacturing the liquid crystal device.

As illustrated in the step S1 of FIG. 18, the light shielding film 11a, the first interlayer insulating film 12, the semiconductor layer 1a, the channel region 1a', the low density source region 1b, the low density drain region 1c, the high density source region 1d, the high density drain region 1e, the storage capacitor electrode 1f, the scanning line 3a, the capacitance line 3b, the second interlayer insulating film 4, the data line 6a, the third interlayer insulating film 7, the contact hole 8, the pixel electrode 9, and the alignment film 40, are formed on the lower substrate main body 10A made of glass, to form the lower substrate (the TFT array substrate) 10. At the same time, the light shielding film 23, the opposing electrode 21, and the alignment film 60, are formed on the upper substrate main body 20A, to form the upper substrate (the opposing substrate) 20.

Next, in step S2, a predetermined amount of liquid crystal, suitable for the gap of the liquid crystal device, is dropped onto the lower substrate (TFT array substrate) 10. Then, in step S3, the sealing material 93 is printed on the upper substrate 20 in the form of a closed ring frame without liquid crystal filling hole.

In step S4, the nozzle head 26 is rotated on the plane, horizontal to the substrate, so that the nozzle holes 37 are arranged in the non-pixel regions 18. Then, in step S5, the spacer dispersion solution, whose density is controlled so that 0.2 to 3 spacers 15 exist in a liquid drop on average, is intermittently discharged from the nozzle holes 37 onto the upper substrate in a predetermined interval b while the nozzle head 26 is scanned onto the upper substrate 20. At this time, the predetermined interval b is set such that the arrangement density of the spacers 15 is 50 to 300/mm² and the interval b is larger than the diameter of the liquid drop 17 discharged onto the substrate. The solvent of the spacer dispersion solution discharged onto the upper substrate 20 evaporates naturally or by a predetermined drying means. As a result, the spacers 15 are arranged in the non-pixel regions 18.

In step S5, the liquid crystal device with the cell structure illustrated in FIG. 3 is manufactured by bonding the lower substrate 10 to the upper substrate 20 and then bonding an optical film (not shown), such as a retardation plate and a polarizing plate, to the outsides of the lower substrate 10 and the upper substrate 20.

Figure 19:
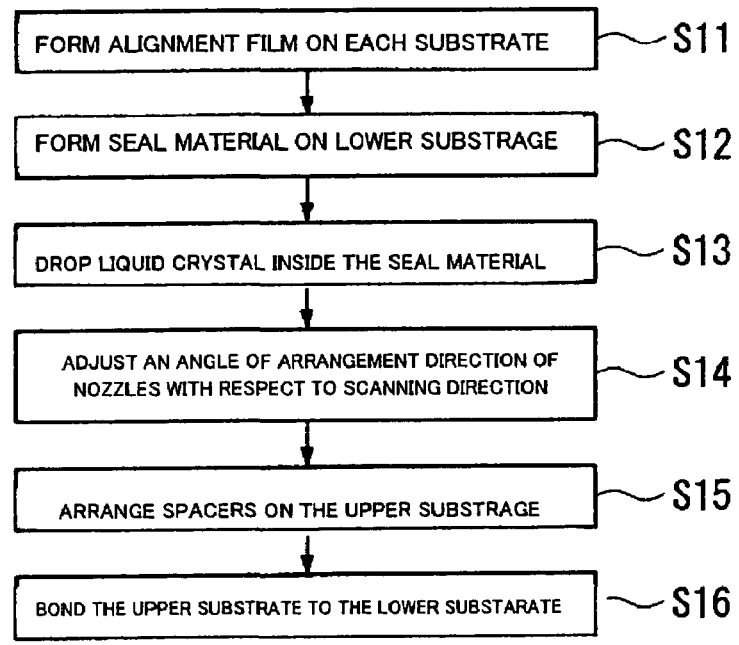
FIG. 19 is a flowchart illustrating a modification of the method of manufacturing the liquid crystal device.

As another example in which a different manufacturing method is used, it is possible to obtain the liquid crystal device according to the above exemplary embodiment using the processes illustrated in FIG. 19.

As illustrated in step S11, similar to the above step S1, the alignment film 40 is formed on the lower substrate main body 10A made of glass to form the lower substrate (the TFT array substrate) 10. Furthermore, at the same time, the alignment 60 is formed on the upper substrate main body 20A to form the upper substrate (the opposing substrate) 20.

Next, in step S12, as described above, the sealing material 93, in the form of the closed ring frame without a liquid crystal filling hole, is printed onto the lower substrate (the TFT array substrate) 10. In step S13, a predetermined amount of liquid crystal is dropped inside the sealing material 93 in the form of the closed ring frame.

In step S14, the nozzle head 26 is rotated on the surface horizontal to the substrate so that the nozzle holes 37 are arranged in the non-pixel regions 18. In step S15, the spacer dispersion solution, whose concentration is controlled so that 0.2 to 3 spacers 15 exist in a liquid drop on the average, is intermittently discharged from the nozzle holes 37 onto the upper substrate 20 while the nozzle head 26 is scanned on the upper substrate 20. In this case, the predetermined interval b is set such that the arrangement density of the spacers 15 is 50 to 300/mm² and the interval b is larger than the diameter of the liquid drop 17 discharged onto the substrate. Then, the solvent of the spacer dispersion solution discharged onto the upper substrate 20 evaporates naturally or by drying. As a result, the spacers 15 are arranged in the non-pixel regions 18.

Next, in step S 16, the liquid crystal device with the cell structure illustrated in FIG. 3 is manufactured by bonding the lower substrate 10 to the upper substrate 20 and bonding an optical film (not shown), such as a retardation plate and a polarizing plate to the outsides of the lower substrate 10 and the upper substrate 20.

Therefore, according to the method of manufacturing the liquid crystal device of the present exemplary embodiment, since the spacers 15 are arranged in the fixed points by the apparatus for arranging the spacers at the fixed points, it is possible to change the density and the arrangement of the spacers 15 using the common nozzle head 26. Thus, it is possible to manufacture the liquid crystal device in which the spacers 15 are optimally arranged in consideration of the thickness uniformity of the cells. Furthermore, it is possible to manufacture the liquid crystal device with a small amount of light leakage and a high display quality since it is possible to ensure the arrangement of the spacers 15 in the non-pixel regions 18 in the liquid crystal device, in which the pixel pitch a is narrower than the nozzle interval c.

Electronic Apparatus

A specific example of the electronic apparatus with the liquid crystal device according to the present exemplary embodiment will now be described.

Figure 22A:
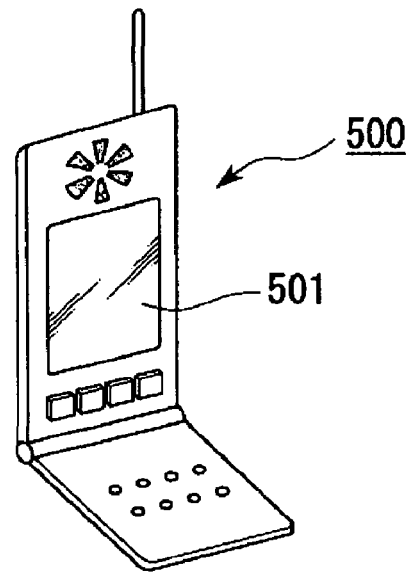
FIGS. 22(a)–22(c) are perspective views illustrating examples of electronic apparatuses utilizing the present invention.
Figure 22B:
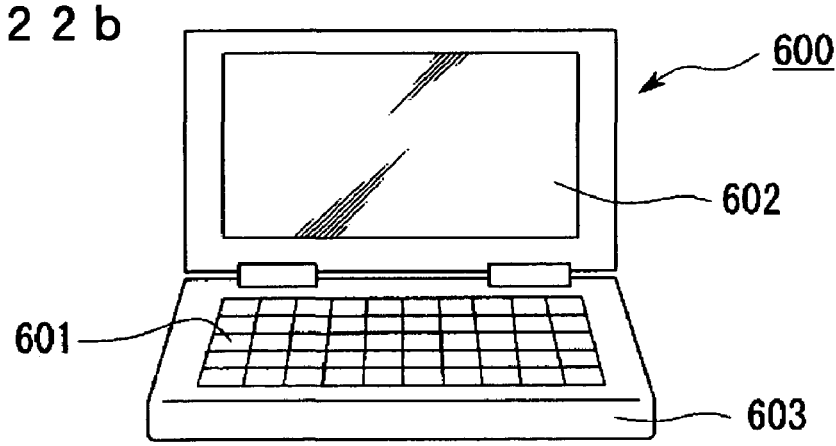
Figure 22C:
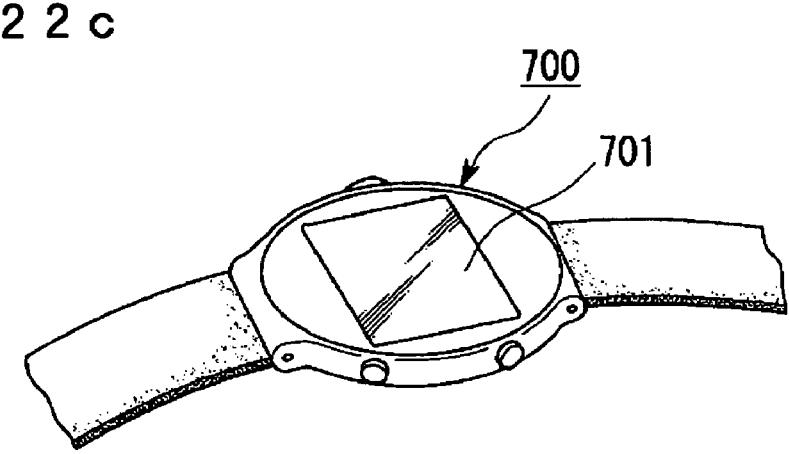
Figure 23:
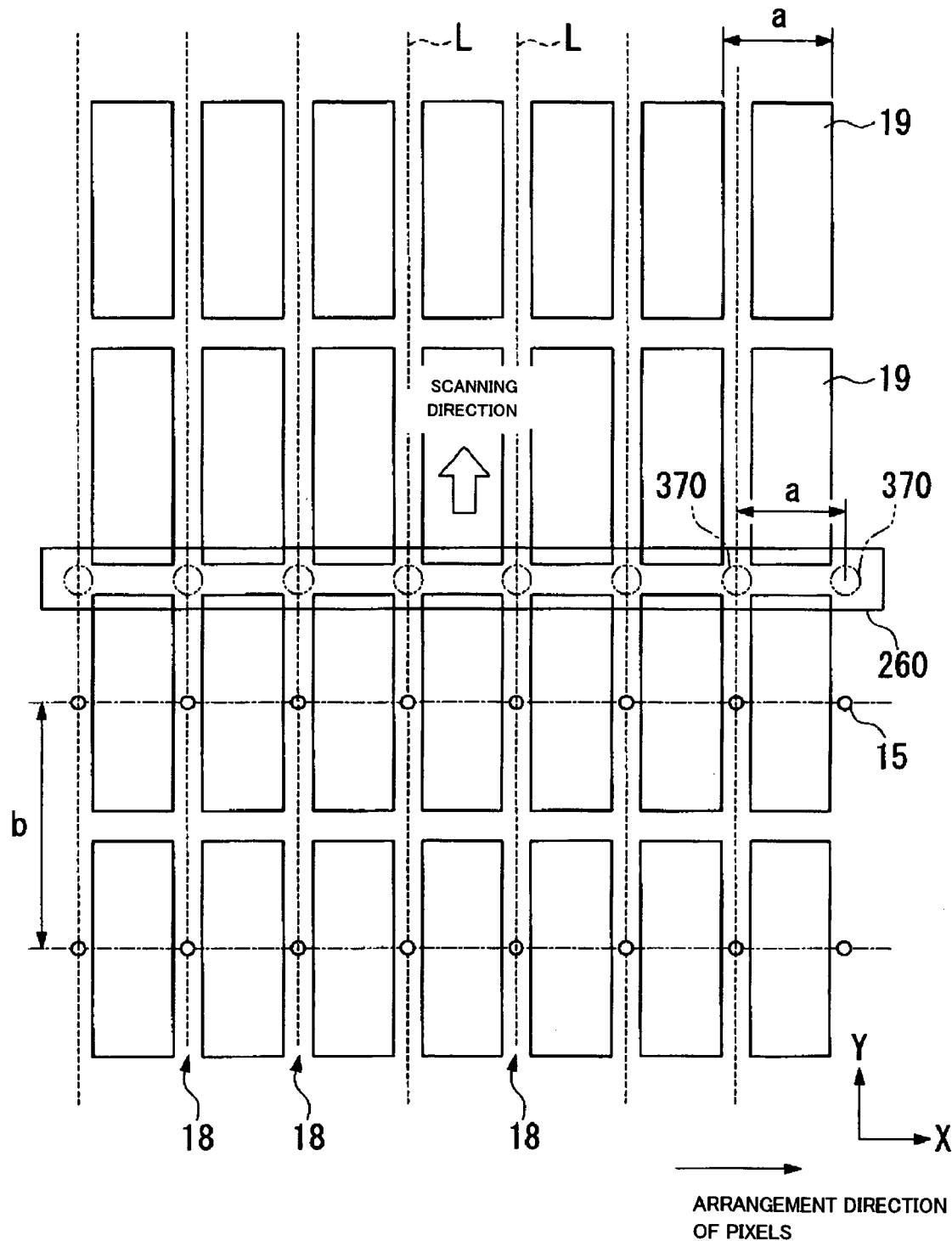
FIG. 23 is a plan view explaining the structure and the operation of a related art inkjet device.

FIG. 22(*a*) is a perspective view illustrating an example of a mobile telephone. In FIG. 22(*a*), reference numeral 500 denotes the main body of the mobile telephone. Reference numeral 501 denotes a liquid crystal display part with the liquid crystal device according to the present exemplary embodiment.

FIG. 22(*b*) is a perspective view illustrating an example of a portable information processing device such as a word processor or a PC (personal computer). In FIG. 22(*b*), reference numeral 600 denotes an information processing device. Reference numeral 601 denotes an input unit such as a keyboard. Reference numeral 603 denotes an information processing main body. Reference numeral 602 denotes a liquid crystal display part with the liquid crystal device according to the present exemplary embodiment.

FIG. 22(*c*) is a perspective view illustrating an example of a wristwatch-type electronic apparatus. In FIG. 22(*c*), reference numeral 700 denotes the main body of a wristwatch. Reference numeral 701 denotes a liquid crystal display part with the liquid crystal device according to the present exemplary embodiment.

Each of the electronic apparatuses illustrated in FIGS. 22(*a*) to 22(*c*) include any one of the liquid crystal devices according to the present exemplary embodiments. Thus, each of the electronic apparatuses can display images with a high display quality.

The present invention is not restricted to the aforementioned exemplary embodiments, and various modifications can be made without departing from the spirit and scope of the present invention.

Figure 21:
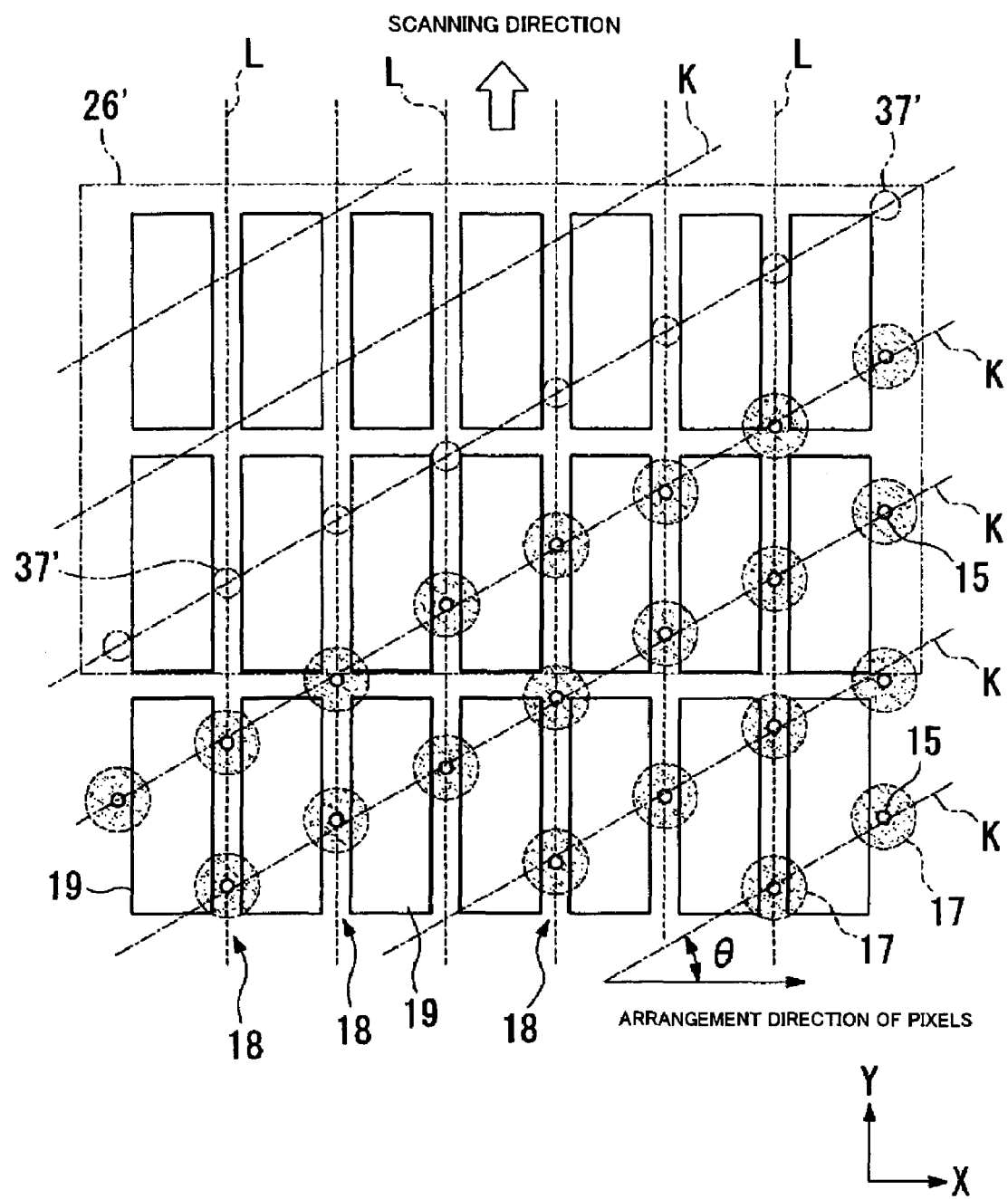
FIG. 21 is a plan view explaining another structure of the head of the inkjet device and the operation thereof.

For example, according to the apparatus for arranging the spacers at the fixed points of the present exemplary embodiment, the nozzle holes 37 are arranged in parallel with the longitudinal direction of the nozzle head 26. However, as illustrated in FIG. 21, the nozzle holes 37' may be diagonally arranged for the longitudinal direction of the nozzle head 26', so that the arrangement direction of the nozzle holes 37' may cross the X axis at a predetermined angle θ. According to the above structure, when the nozzle head 26' is scanned in the direction of the Y axis and the spacer dispersion solution is discharged from the nozzle holes 37' onto the substrate in the predetermined interval b in a state where the longitudinal direction of the nozzle head 26' is parallel to the X axis, similar to the above exemplary embodiment, the spacers 15 are arranged on the substrate along the first virtual lines L in the predetermined interval b and along the second virtual lines K, which cross the X axis at the angle θ, in the predetermined interval c. Therefore, the spacers 15 can be definitely arranged in the non-pixel regions 18 in the liquid crystal device in which the pixel interval a is narrower than the nozzle interval c.

As described above, according to the present invention, since the nozzle holes are arranged in a direction perpendicular to the scanning direction at a predetermined angle, the interval of the spacers, which are arranged along the scanning direction in a line, can be narrower than the interval of the nozzle holes. Therefore, it is possible to precisely arrange the spacers using the nozzle head, in which the nozzle holes are arranged far apart and which do not require a high manufacturing precision. Furthermore, it is possible to optimize the arrangement density of the spacers and the number of spacers that exist in a liquid drop, thereby effectively preventing the unevenness in the thickness of the cell and the inferiority in the display, which is caused by the light leakage due to the spacers.

When the nozzle head is rotatably structured on the plane horizontal to the substrates, it is possible to arbitrarily control the interval of the spacers arranged in a line along the scanning direction by controlling the angle, where the arrangement direction of the nozzle holes crosses the scanning direction of the nozzle head. Therefore, it is possible to arrange the spacers in various densities or in various line intervals using the nozzle head, in which the interval of the nozzle holes is fixed.

What is claimed is:

1. An apparatus to arrange spacers at fixed points on a display substrate utilizing a spacer dispersion solution that includes the spacers dispersed in a solvent, the apparatus comprising:
   a nozzle head discharging the spacer dispersion solution from a plurality of nozzle holes, while scanning along a predetermined scanning direction, the plurality of nozzle holes being arranged at a non-zero angle with respect to a direction perpendicular to the scanning direction.

2. An apparatus to arrange spacers at fixed points on a display substrate utilizing a spacer dispersion solution that includes the spacers dispersed in a solvent, the apparatus comprising:
   a nozzle head discharging the spacer dispersion solution from a plurality of nozzle boles, while scanning along a predetermined scanning direction,
   the nozzle head being rotated such that an arrangement direction of the plurality of nozzle holes is inclined at a non-zero angle with respect to a direction perpendicular to the scanning direction.

3. A method of manufacturing a liquid crystal device, in which a pair of substrates are arranged to face each other with a sealing material interposed therebetween, liquid crystal and spacers are injected into the space surrounded by the pair of substrates and the sealing material, and the space is sealed, the method comprising:
   intermittently discharging a spacer dispersion solution from nozzle holes onto any one substrate of the pair of substrates while a nozzle head is scanning the one substrate along the scanning direction where an arrangement direction of the nozzle holes in an apparatus to arrange the spacers at fixed points according to claim 1 is inclined at a predetermined angle with respect to a direction perpendicular to the scanning direction.

4. The method according to claim 3, during the intermit discharging of the spacer dispersion solution, the discharge interval of the spacer dispersion solution is larger than the diameter of the spacer dispersion solution discharged onto the substrate.

5. A liquid crystal device, comprising:
   a pair of substrates arranged to face each other with a sealing material interposed therebetween;
   liquid crystal and spacers injected into a space surrounded by the pair of substrates and the sealing material, and the space is sealed,
   one of the pair of substrates having a plurality of pixel regions and non-pixel regions formed around the pixel regions,
   the spacers being arranged in a straight line at a non-zero angle with respect to an arrangement direction of the pixel regions in plan view; and
   a portion of the spacers being located at intersections of the non-pixel regions and another portion of the spacers being arranged at locations other than intersections of the non-pixel regions.

6. The liquid crystal device according to claim 5, the spacers being in the form of a mixture of a single element and an aggregate, the arrangement density of the spacers is 50 to 300/mm$^2$, and the average number of spacers per liquid drop is 0.2 to 3.

7. The liquid crystal device according to claim 5, the spacers being arranged in the non-pixel regions.

8. The liquid crystal device according to claim 7, a light shielding layer being formed in portions corresponding to the non-pixel regions, where the spacers are arranged.

9. The liquid crystal device according to claim 5, the spacers being colored.

10. The liquid crystal device according to claim 5, a process of controlling the alignment of the liquid crystal being performed on the surfaces of the spacers.

11. The liquid crystal device according to claim 5, a fixing layer fixing the spacers to the substrate being formed on the surfaces of the spacers.

12. An electronic apparatus, comprising:
    the liquid crystal device according to claim 5.

13. The apparatus according to claim 1, wherein the nozzle head scans across and discharges the spacers dispersion solution on a substrate having a plurality of pixel regions and non-pixel regions formed around the pixel regions, the plurality of nozzle holes in the nozzle head having a pitch that is greater than a pitch of the pixel regions in a direction perpendicular to the scanning direction.

14. The method according to claim 3, the one of substrate having a plurality of pixel regions and non-pixel regions formed around the pixel regions, the plurality of nozzle holes in the nozzle head having a pitch that is greater than a pitch of the pixel regions in a direction perpendicular to the scanning direction.

* * * * *